US 6,557,110 B2

(12) United States Patent
Sakamoto et al.

(10) Patent No.: US 6,557,110 B2
(45) Date of Patent: Apr. 29, 2003

(54) CHANNEL-TO-CHANNEL SKEW COMPENSATION APPARATUS

(75) Inventors: Takeshi Sakamoto, Tokyo (JP);
Nobuyuki Tanaka, Tokyo (JP);
Yasuhiro Ando, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/986,526

(22) Filed: Nov. 9, 2001

(65) Prior Publication Data

US 2002/0029355 A1 Mar. 7, 2002

Related U.S. Application Data

(62) Division of application No. 09/249,488, filed on Feb. 12, 1999, now Pat. No. 6,336,192.

(30) Foreign Application Priority Data

Feb. 16, 1998 (JP) ............................................ 10-032618
Mar. 11, 1998 (JP) ............................................ 10-059542
Mar. 25, 1998 (JP) ............................................ 10-077783

(51) Int. Cl.[7] ................................................ G06F 11/00
(52) U.S. Cl. ...................................... 713/503; 714/700
(58) Field of Search ................................. 713/400, 503; 714/700

(56) References Cited

U.S. PATENT DOCUMENTS

| 3,909,711 A | 9/1975 | Bussgang et al. |
| 4,275,457 A | 6/1981 | Leighou et al. |
| 5,742,907 A | 4/1998 | Brown |
| 5,761,209 A | 6/1998 | Murakami |

FOREIGN PATENT DOCUMENTS

| EP | 0 427 377 A2 | 5/1991 |
| JP | 52-074246 | 6/1977 |
| JP | 2-272942 | 11/1990 |

(List continued on next page.)

OTHER PUBLICATIONS

Hiroyuki Rokugawa et al., "Skew–Free Parallel Optical Transmission Experiments Using Optical Multichannel Transmitter/Receiver Module," Technical Report of IEICE, CS94–24, OCS94–14, pp. 93–99 (1994).

Takeshi Sakamoto et al., "Skew–Compensation Circuits for Parallel Optical Interconnections," Technical Report of IEICE, EMD98–40, CPM98–88, OPE98–61, LQE98–55, pp. 79–84 (1998).

Takeshi Sakamoto et al., "Skew–Compensation Circuits for Parallel Optical Interconnections," Third Optoelectronics and Communications Conference Technical Digest, pp. 420–421, (1998).

(List continued on next page.)

*Primary Examiner*—Thomas M. Heckler
(74) *Attorney, Agent, or Firm*—Finnegan, Henderson, Farabow, Garrett & Dunner LLP

(57) ABSTRACT

A channel-to-channel skew compensation apparatus is provided with N number of frame synchronization circuits 11 for generating frame signals to indicate data position of parallel data on a common time axis for each data transmission channel; a reference timing determination circuit 16 for determining a reference timing based on N frame signals output from the frame synchronization circuit 11; a skewing amount detection section 15 for generating N skewing amount signals according to the reference timing determined by the reference timing determination circuit 16; and a timing compensation section 13 for adjusting output timing of parallel data for each transmission channel according to the skewing amount signal generated by the skewing amount detection section 15.

12 Claims, 21 Drawing Sheets

FOREIGN PATENT DOCUMENTS

| | | |
|---|---|---|
| JP | 4-178047 | 6/1992 |
| JP | 05-037580 | 2/1993 |
| JP | 05-227243 | 9/1993 |
| JP | 06-139030 | 5/1994 |
| JP | 06-311048 | 11/1994 |
| JP | 09-247140 | 9/1997 |
| JP | 10-013398 | 1/1998 |
| JP | 11-074945 | 3/1999 |
| JP | 11-112485 | 4/1999 |
| WO | WO 97/04540 | 2/1997 |

OTHER PUBLICATIONS

Shigeo Sugou et al., "Optical Interconnection; Long Wavelength New Materials and Skewless 8Gbps Subsystem," Proceedings RWC Technical Report (TR–98001), pp. 83–86, (1998).

Atsushi Takai, "Parallel Optical Link for Parallel Processor Systems," Computer Architecture 122–3, pp. 9–14, (1997).

Takeshi Sakamoto et al., "Skew–Compensation Circuits for Parallel Optical Interconnection," IEICE General Conference Collected Papers, p. 665, (1998).

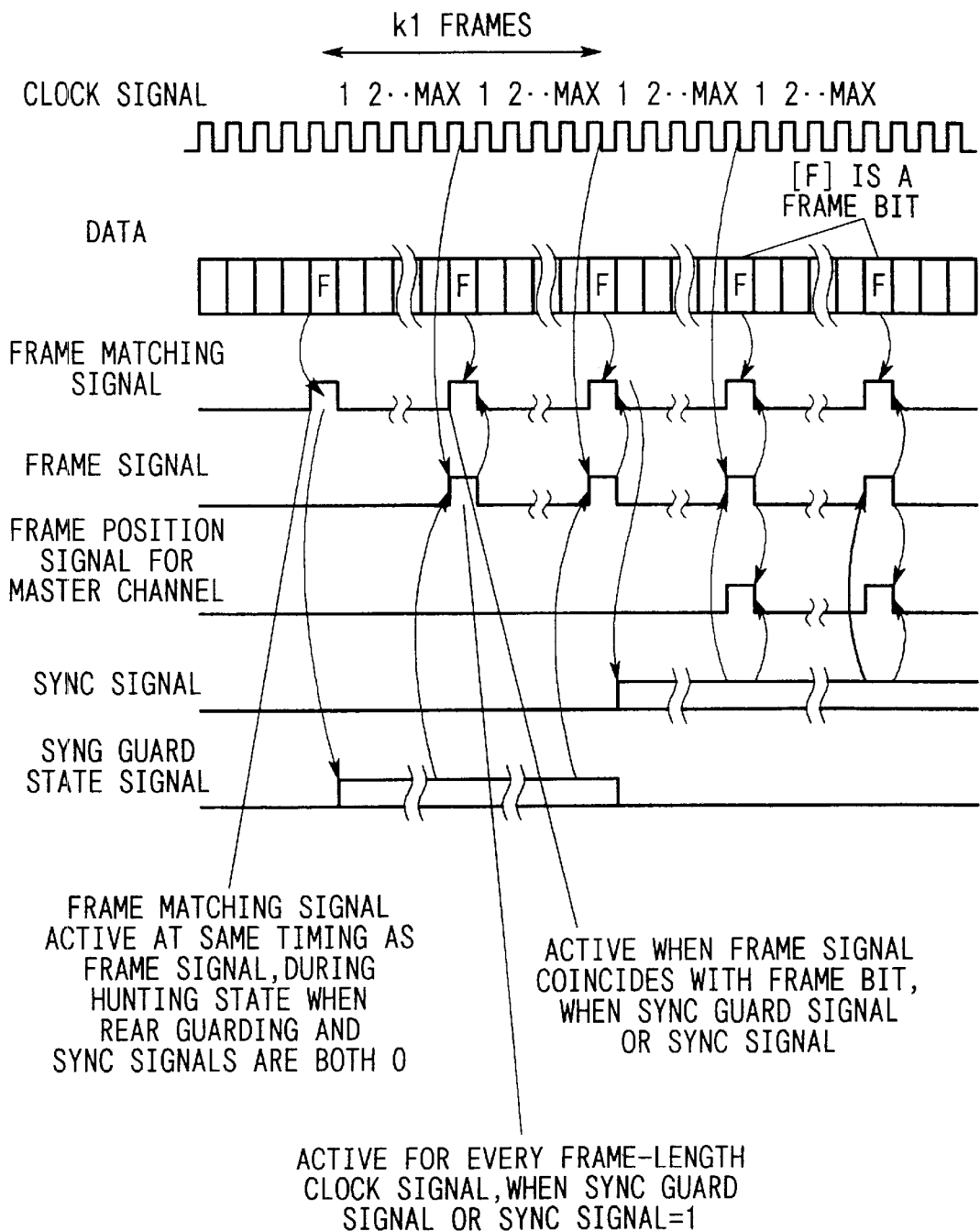

CHANNEL-TO-CHANNEL SKEW COMPENSATION APPARATUS

CROSS-REFERENCE TO RELATED APPLICATIONS

This application is a division of U.S. patent application Ser. No. 09/249,488, entitled "PARALLEL REDUNDANCY ENCODING APPARATUS," filed on Feb. 12, 1999, now U.S. Pat. No. 6,336,192, to which Applicants claim the benefit under 35 U.S.C. §120. Applicants claim the right of priority under 35 U.S.C. §119(a)–(d) based on Japanese Patent Application No. 10-032618, filed on Feb. 16, 1998; Japanese Patent Application No. 10-059542, filed on Mar. 11, 1998; and Japanese Patent Application No. 10-077783, filed on Mar. 25, 1998. The contents of all of the above-identified applications are expressly incorporated herein by reference in their entirety.

BACKGROUND OF THE INVENTION

1. Field of the Invention

The present invention relates to a parallel redundancy encoder, that can be used for transmitting parallel data in information and communication processing systems, of a simple configuration requiring no clock speed conversion, and to a channel-to-channel skew compensation apparatus for the data being transmitted in a plurality of channels.

2. Description of the Related Art

The present invention is based on Patent Applications Nos. Hei 10-032618, Hei 10-059542 and Hei 10-077783 filed in Japan, contents of which incorporated herein by reference.

Processing speeds of data processing devices such as central processor unit (CPU) in information and communication systems have shown yearly increase in recent years, brought about by improvements in operating speed of large scale integration (LSI) devices. Along with this trend, there has been an increasing demand for data transfer speeds between data processing devices. Also, to improve processing capability of such systems, progress has been made in the technology for operating a plurality of devices in parallel, and there has been increasing demand for improved performance of data transmission over a long distance.

Optical data transmission is capable of transmitting data at high speeds over long distances, and expectations are high for its use within a system for the purpose of information processing and data communication. Within such a system, data are processed as 8-bit or 16-bit parallel data, and therefore, an optical data transfer system must also be capable of providing parallel data transfer. Data transfer based on optical devices is often carried out by encoding the data to obtain stability in d.c. signal level of incoming data and to enable detection and correction of data errors.

Data transmission duration in parallel data transmission systems described above can vary from channel to channel, because of differences in the performance characteristics of each channel and operating characteristics of communication circuitries, resulting in a scatter in data arrival times of data transmitted through different channels. For this reason, differences in arrival times are generated in the receiver-side of such parallel data transmission systems. The differences in data arrival times in different transmission channels are referred to as channel-to-channel skew.

When the speed of data transmission is slow or the distance of transmission is short, channel-to-channel skew is negligibly small compared with a unit clock time of the parallel interconnection system, such that it does not present a serious problem. However, as the speed of data transmission increases as the unit clock time of the parallel interconnection system becomes shorter in high speed transmission systems, data can no longer be received normally at the receiver terminal due to the channel-to-channel skew effects. Also, because the scatter in data arrival times caused by differences in the performance characteristics of the channels are proportional to the transmission distance, so the longer the distance of parallel data transmission the larger the channel-to-channel skew effects, and normal data communication becomes difficult.

For this reason, to increase the speed and distance of transmission of parallel interconnection systems, it becomes important to compensate for the channel-to-channel skew. In particular, increased transmission speed and distance in parallel interconnection systems can be more readily attained by optical methods rather than electrical methods, and compensation for channel-to-channel skew becomes critical. Therefore, encoding is often used in parallel interconnection to enable such compensation for channel-to-channel skew effects.

Here, one of the encoding methods known to enable skew compensation is to insert m' bits of redundant data for each m bits of transmission data train in each channel, which called frame bits. In this encoding method, m-bits of transmission data and m' bits of frame bits are combined to constitute a frame of m+m' bits. FIG. 20 illustrates an example of bit arrangement in such a frame.

An apparatus known widely for multiplexing data produced by parallel redundancy encoding is shown in FIG. 21. Encoder 75 performs parallel/serial conversion of m-bit parallel data and m'-bit redundant data output from a redundant data generator 76 to a serial data train in a p-s conversion section 77 at m+m':1 clock rate. One apparatus of parallel redundancy encoder 70 is comprised by arranging several encoders 75 in parallel.

In contrast, FIG. 22 shows a functional block diagram of a parallel redundancy encoder that does not multiplex data for transmission. Encoder 75 inserts m' bit of redundant data output from redundant data generator 79 for each m bits of data train input into a frame bit insertion section 78 at a bit speed of $f_0$, and encodes the combined data by sending at a bit speed of $(m+m')/(m) \times f_0$. One parallel redundancy encoder 70 is comprised by arranging several encoders 75 in parallel.

Other well known types of encoding method include "mB1A coding" which adds one auxiliary bit for each m bits of data. Variations of mB1A coding include a case of using the auxiliary bit as the parity bit, known as "mB1P coding", and a case of using a coding bit for the preceding bit, known as "mB1C coding". Also, in addition to those method that rely on inserting a special frame bit in frames in each channel, there are encoding methods that do not use frame bits, represented typically by "8B10B coding".

Next, FIG. 23 shows an example of the conventional channel-to-channel skew compensation apparatus received in the receiver channels that detects and compensate for the skewing amount in data generated by such parallel redundancy encoder described above. In the channel-to-channel skew compensator, shown in FIG. 23, pre-selected one channel among the parallel interconnections is designated as the reference group train, i.e., the master channel. Master channel frame sync circuit 82 enters master channel input data into the master channel and outputs master channel frame signals (sync signals) to indicate the input data positions along the time axis.

In all channels other than in the master channel, each frame sync circuit 83 enters own input data into respective channels, and generates frame signals to indicate the input data positions along respective time axes. In all channels other than the master channel, own comparison circuit 84 is provided. Each comparison circuit 84 compares frame signals in own channel with master channel frame signals. In other words, comparison circuit 84 determines how far ahead or behind its own frame signal is compared with the corresponding master frame signal, and outputs advance/delay information as a skew signal.

Input data into the master channel are delayed by the master channel data delaying circuit 85 for a pre-determined time duration. All input data other than the master channel data are delayed by their own data delaying circuit 86. Each data delaying circuit 86 receives own skew signal, and adjusts the degree of skewing so as to match own frame position to the respective master frame position.

The location of master channel data delaying circuit 85, whether it is in front or back of the master channel frame sync circuit 82, does not affect the operating principle. Resulting from such series of adjustment steps, parallel data compensated for channel-to-channel skewing are generated.

However, in the conventional channel-to-channel skew compensation apparatus, should the degree of skewing is altered in the master channel, master signal timing is altered, i.e., reference positions of the master channel frame signals are altered. Therefore, in all the channels other than in the master channel, each comparison circuit 84 adjusts the degree of skewing produced by the respective data delaying circuits 86. When the signal delay amount is changed according to the adjustment in the master channel, positions (timing) of the data bit train of the skew-compensated data become instantaneously shifted with respect to the master frame positions, thereby creating errors in the transmitted data.

For example, in case the bit numbers for the reference time point for data in the channel-to-channel skew compensation apparatus change in a sequence such as 1,2,3,4,5, . . . , at the time the bit number of the reference time point is 2, when the amount of signal delay is updated and the position of the data is shifted one bit in the advancing direction, the data for the bit numbers 1,2,4,5, . . . appear in the data after compensation, which is to say that the bit number 3 disappears.

Additionally, in case the bit numbers for the reference time point for data in the channel-to-channel skew compensation apparatus change in a sequence such as 1,2,3,4,5, . . . , at the time the bit number of the reference time point is 3, when the amount of signal delay is updated and the position of the data is shifted one bit in the reversing direction, the data for the bit numbers 1,2,3,3,4,5, . . . appear in the data after compensation, which is to say that the bit number 3 is replicated.

Of course, when skewing is altered in the channels, unless the signal delay amount is updated, continuous errors would be generated in the skew-compensated data due to inappropriate actions in the channel-to-channel skew compensation apparatus, and therefore, updating of delay amount is absolutely essential. It should be noted that this type of error can be generated in all the channels excepting in the master channel.

Also, for designing a channel-to-channel skew compensation apparatus such as the one shown in FIG. 23, two extreme delay possibilities must be considered for the master channel: master channel may be the channel exhibiting either the maximum delay or the minimum delay.

For example, when deciding the bit number x (natural number) to compensate for a possible amount of channel-to-channel skew, data delay in the master channel data delaying circuit 85 may be chosen to be (x+1) bits, then, in channels other than the master channel, it is necessary to select the maximum data delay in the data delay circuit 86 to be (2×x+1) bits.

Consequently, in the conventional channel-to-channel skew compensation apparatus for guaranteeing x-bits compensation for channel-to-channel skewing, a maximum delay of (2×x+1) bits is generated. Such a large amount of delay is detrimental to the development of high speed parallel data transmission system.

Another known type of skew control incorporates a synchronization guard circuit in the channel-to-channel skew compensation apparatus to prevent erroneous operation caused by noise and increase the reliability of frame synchronization. In such a system, a synchronization guard circuit is provided, and signal delay amount is updated in each channel when frame bits are detected contiguously over a certain number of frames at the same timing as inside the frame.

In such a channel-to-channel skew compensation apparatus, between the time of alteration in skewing and updating of signal delay amount by returning to frame synchronization state, there may be a delay in controlling the skew for an interval of up to ten times the frame length, for example, and during this delay interval, erroneous data will continue to be output as skew-compensated data. Such a problem can happen in various kinds of channel-to-channel skew compensation apparatuses equipped with a synchronization guard circuit to increase the reliability of frame synchronization.

In the parallel redundancy encoder such as the ones shown in FIGS. 21, 22, bit speed of input data is different than the bit speed of output data such that it is necessary to provide two types of clocks operating at different speeds. For this reason, it becomes necessary to provide a PLL circuit (phase-locked loop circuit: phase synchronizing loop circuit), however when a PLL circuit is included in an encoding device, it creates a problem that the circuit size becomes large. Also, PLL circuit must be adjusted to the speed of the drive clock, thus creating a problem that it cannot be operated at any desired clock speed. Furthermore, in the conventional parallel encoding method described above, there is a problem that clock speed conversion circuits become necessary in the receiver-side decoder for deleting redundant data from the transmitted data.

SUMMARY OF THE INVENTION

Therefore, one object of the present invention relates to a technique of encoding parallel data, and to provide a parallel redundancy encoding apparatus, of a relatively simple construction by eliminating the need for speed conversion circuits, that can respond flexibly to changes in bit speeds.

Another object is to provide a channel-to-channel skew compensation apparatus that can prevent changes in skewing amount generated in one problem transmission channel from affecting other problem-free transmission channels and to adjust the delay amount in the problem channel by using the skew compensation circuit.

Further object is to provide a channel-to-channel skew compensation apparatus that can prevent outputting erroneous data by shortening the time span between a state of frame synchronization loss and regaining of a state of frame synchronization to update the signal delay amount.

The object related to parallel redundancy encoding has been achieved in a parallel redundancy encoding apparatus to encode m channels of parallel data input in synchronization with clock signals, comprising: a redundancy generation section for generating m' channels of redundant data; and a data switching section for accepting m+m' channels of parallel input data, comprised by the m' channels of redundant data added to the m channels of the parallel data, and outputting m+m' channels of parallel data by switching data in each channel for every clock signal according to a pre-determined rule.

In the parallel redundancy encoding apparatus for encoding m channels of parallel data, it is preferable that the data switching section switches data according to a pre-determined pattern repeated at m+m' clock cycles. It is also preferable that the data switching section switches data so as to output m' clock pulse counts of redundant data between every channels operating at m+m' clock cycles. Further, it is preferable that the data switching section switches data so as to produce a common serial pattern in all output channels, and that each serial pattern output is shifted by one bit in each channel with respect to a common reference time point. The apparatus may be operated such that the redundancy data generation section derives m' channels of redundant data from a serial pattern of m channels of data according to a pre-determined rule.

According to the present parallel redundancy encoding apparatus to provide stability of direct current level in received signals, detection of channel-to-channel skewing and detection of data errors without the need of a speed conversion section. Because such speed conversion sections are not needed, encoding apparatus is simplified so that the apparatus presents many advantages including compact size, lower power consumption and overall cost. Also, because there is no need for speed conversion circuits which need to be adjusted to a particular operating speed, one parallel encoding apparatus can be operated at any desired clock speed, so that the need for providing a plurality of parallel encoding apparatuses to suit various operating speeds is eliminated. Further, because the encoding apparatus can be operated at any desired speed, it enables to realize an encoding apparatus that can be operated at various speeds to suit changes in the traffic density of transmission data. Such a parallel data encoding system can provide many advantages including lower power consumption.

The object related to channel-to-channel skew compensation has been achieved in a channel-to-channel skew compensation apparatus of the present invention comprising: an N number of frame synchronization circuits, provided for each transmission channel used, receiving parallel input data comprised by N parallel bits of not less than two bits located at identical bit-positions arranged on a common time axis, transmitted in parallel over N transmission channels, and generating frame signals to indicate positions of the parallel data on the common time axis for each operative transmission channel; a reference timing determination circuit for deciding a reference timing according to N pieces of frame signals output from the frame synchronization circuits; a skewing amount detection section for generating N pieces of skewing amount signals according to the reference timing determined by the reference timing determination circuit; and a timing compensation circuit provided in each transmission channel for adjusting output timing of the parallel data in individual transmission channels according to skewing amount signals generated by the skewing amount detection section.

Here, when a skew is not produced between the data of the contents of each transmission channel, the N frame signals generated on each of the above transmission channels have no relation to the contents of the data of each transmission channel, and all N frame signals are output from the synchronous frame circuit at the same time.

The skew compensation apparatus of such a construction has no special channel such as the master channel, but skewing amount is detected and compensated in each transmission channel individually. Reference timing required for detecting a skewing amount is determined according to N frame signals output from the frame sync circuit in each channel, thereby eliminating the need for special fixed channel so that the maximum delay amount required in timing compensation section is lessened compared with prior art systems. Therefore, the present system can operate more reliably.

For example, when the timing of the last signal of the N frame signals generated corresponding to each of the N transmission channels appearing at the reference time point is chosen as the reference timing, there are no frame signals after the reference timing, therefore, the timing compensation section only needs to delay the progress of the data by the amount of the clock pulse counts equal to reference timing. In other words, in the present channel-to-channel skew compensation apparatus, the maximum delay amount to guarantee skew compensation in all the channels is limited to (x+1) bits for x-bits frame length or the x-bits length of the bit holder. Also, the skewing amount detection section and timing compensation section are operating independently in individual channels so that skew problems in one channels does not affect other channels.

The reference timing determination circuit in the channel-to-channel skew compensation apparatus may include an N number of shift registers to store a plurality of N frame signals over given clock cycles, and a logic computation section to determine reference timing based on output signals from the shift registers.

For example, when a k-bit shift register is used for the above shift register, input signals can be stored in the shift register for a cyclic duration of k clock pulses. Therefore, when N frame signals in each transmission channel are held in the respective shift register for a plurality of clock cycles, a plurality of frame signals appearing at the common reference time point at different times on the common time axis can be monitored at the same timing. Thus, when channel-to-channel skewing is generated, the logic computation section needs to monitor the frame signals held in the shift register to check that all N signals have passed through within a given time. The reference timing is determined by the identify operation of the logic computation section.

Also, the skewing amount detection section in the channel-to-channel skew compensation apparatus may include a data holding section in each channel for holding signals output from the shift registers at a reference timing determined by the reference timing determination circuit.

That is, because the above construction allows N frame signals in each channel to be stored in the shift register during a plurality of clock cycles, a plurality of frame signals appearing at the common reference time point at different times on the common time axis can be monitored at the same timing. And, when N frame signals are held in the shift register, the data holding section latches the output signals from the shift register, and timing shift between the transmission channels, i.e. skewing, can be detected.

The logic computation section in the channel-to-channel skew compensation apparatus may include a start signal generation section for generating a start signal upon detecting that a frame signal is held in all N number of the shift registers in the reference timing determination circuit; and a counter section for counting a given count of clock pulses according to the start signal and repeatedly output the reference timing signals at a period identical to a frame period of the parallel data.

When data having a constant frame length is to be input, this construction allows the data to be input repeatedly to correspond with the frame length. By outputting reference timing signals at the same cycle as the frame period, skewing can be checked in individual data frames. The counter section checks one frame period.

The logic computation section in the channel-to-channel skew compensation apparatus may include a reset signal generation section for stopping operation of the counter section, when the counter section is outputting the reference signals, upon detecting that a frame signal is not held in any one of N shift registers in the reference timing determination circuit.

That is, when a reference timing is to be used after one frame period has passed since the frame period had been determined, it is necessary to consider fluctuation in skewing amount during the following one frame period. Particularly, if the first signal is advanced or the last signal is delayed in any of the N frame signals, there will be some channels for which skewing cannot be checked. Because the reset signal generation section generates a reset signal to stop the operation of the counter section, error generation can be suppressed.

The start signal generation section in the channel-to-channel skew compensation apparatus may include a mid-position identify section for generating a start signal, upon detecting that a frame signal is held in all N number of the shift registers in the reference timing determination circuit, by identifying a bit-position which appears first on the common time axis as a leading position of the N frame signals, and identifying another bit-position which appears last on the common time axis as a trailing position, so as to output a start signal when a mid-position frame between the leading position and the trailing position approaches a middle-bit position of a shift register in individual frame circuits.

That is, if the reference timing is selected when all N shift registers are holding a frame signal, if the last frame signal is further delayed due to fluctuation occurring in one frame period, there is high probability that some channels cannot be checked for skewing. Therefore, by adopting the above construction, the reference timing is selected when the mid-position of the overall range between the leading frame signal to the trailing frame signal coincides with the middle of the shift register. According to this approach, when the shift amount between the leading and trailing frame signals is sufficiently smaller than the number of bits in the shift register, even in a case of leading bit advancing or trailing bit delaying due to fluctuation caused within a frame period, probability is low that the position of these frames will be outside the holding capability of the shift register. Therefore, this approach minimizes generation of errors of this type.

The start signal generation section may include a multiple-position identify section for identifying a frame position on the common time axis that is shared by a maximum number of frame signals among N number of frame signals as a maximum position, so as to output the start signal when a frame signal on the maximum position approaches the middle-bit position of a shift register in individual frame circuits.

That is, variations in the required transmission time in individual channels are assumed to follow a statistical distribution pattern, and it may be considered that the probability is highest for the mid-position between the leading frame signal and the trailing frame signal to coincide with the middle-bit position of the shift register. Therefore, the above construction allows to select the reference timing to be the period between the mid-position of the frame coinciding with the middle-bit of the shift register. And, when the shift amount between the leading and trailing frame signals is sufficiently smaller than the number of bits in the shift register, even in a case of leading bit advancing or trailing bit delaying due to fluctuation caused within a frame period, probability is low that the position of these frames will be outside the holding capability of the shift register. Therefore, this approach minimizes generation of errors of this type.

The object to provide a channel-to-channel skew compensation apparatus that can shorten the time required to correct frame synchronization loss, caused by fluctuation in channel-to-channel skewing amount, to return to the frame synchronization state to enable to update the signal delay amount is achieved by providing skew compensation during decoding of error correction when the input parallel data have been encoded for error correction. It should be noted that "parallel data encoded for error correction" means not only parallel data encoded by the present redundancy encoding apparatus but also those parallel data encoded by other methods.

That is, the above object is achieved in a channel-to-channel skew compensation apparatus, comprising: an error correction section receiving parallel data which have been error correction encoded for channel-to-channel positional shifts on the common time axis and decoding error corrections of the parallel data, and generating an error signal to indicate that there is or there is no error in each transmission channel; and a channel-to-channel skew compensation section for adjusting channel-to-channel positional shifts on the common time axis in the parallel input data.

The apparatus enables to detect bit errors in each channel during the decoding process of error correction encoded parallel data, and when the frequency of error detection is high, amount of skewing correction provided by the channel-to-channel skew compensation section is not appropriate, so that the amount of compensation is altered. On the other hand, if the frequency of error detection is low, the amount of compensation can be considered appropriate. In other words, controlling the channel-to-channel skew compensation section, according to the errors detected by the error correction section, enable channel-to-channel compensation of high reliability.

In addition, in the present channel-to-channel skew compensating apparatus, control is executed by error signals of high reliability output by the error correction section, so there is no need for checking the synchronization state over a large number of frames. That is, it is not necessary to check the synchronous state over a large number of frames by detecting frame synchronization or frame asynchronization based on error signals because the error signals output from the error correction section are output for every clock pulse, and when the channel-to-channel skewing amount fluctuates, the amount of skewing correction can be renewed very quickly by tracking the change in real-time.

The channel-to-channel skew compensation apparatus may be comprised by a frame position detection section in each transmission channel for detecting frame positions on a common time axis of the parallel input data; a channel-to-channel skew compensation section (20) for adjusting channel-to-channel positional shifts in the parallel data on the common time axis, based on frame positions in not less than two transmission channels on the common time axis detected by the frame position detection section; an error correction section receiving parallel data that are error correction encoded for channel-to-channel positional shifts on the common time axis, and decoding error corrections provided for the parallel data, and generating an error signal to indicate that there is or there is no error in each transmission channel; and an error control section for controlling a detection state of the frame position detection section according to error signals output by the error correction section.

In the above apparatus, frame position detection section detects frame positions in the parallel data in each transmission channel on the common time axis. The channel-to-channel skew compensation section adjusts positional shift of parallel data in different channels, according to frame positions in at least two transmission channels, detected by the frame position detection section, that are on the time axis. The error correction section receives parallel data corrected for positional shift on the time axis in different channels, and perform error correction decoding, and generates error signals, to indicate there is or there is no error, for each transmission channel. The error control section controls the detection state of each frame position detection section according to the error signals output from the error correction section.

When performing error correction decoding of the error correction encoded parallel data, it is possible to detect whether there is bit error in individual channels. When the frequency of error detection is high, amount of skewing correction provided by the channel-to-channel skew compensation section is not appropriate, so that the amount of compensation is altered. But, if the frequency of error detection is low, the amount of compensation can be considered appropriate.

By adopting the above construction, control is executed in real-time by error signals of high reliability output by error correction section to detect the detection state of the frame position detection section, so that there is no need for checking the synchronization state over a large number of frames. In other words, when the channel-to-channel skewing amount fluctuates, the amount of skewing correction can be renewed very quickly by tracking the changes in real-time.

In the above channel-to-channel skew compensation apparatus, a synchronization guard section may be provided in each transmission channel for delaying an adjustment of a positional shift, detected by the frame position detection section, to be applied by the channel-to-channel skew compensation section until specific conditions are fulfilled.

That is, transmitted signals are affected by noise, so that the reliability of such data as frame bit synchronization signals contained in parallel data is low. Therefore, by renewing the skewing amount according to simplistic synchronization signal only, such a correction process is susceptible to generation of large errors. Therefore, the above synchronization guard section delays applying the amount of skewing compensation detected by the frame position detection section to the channel-to-channel skew compensation section until certain conditions are established. This approach prevents identification of frame position caused by temporary disturbance caused by transient factors such as noise, thereby increasing the reliability of error control.

A frame loss detection section for the channel-to-channel skew compensation apparatus may be provided in each transmission channel for detecting a frequency of errors generated in each transmission channel, based on error signals output from the error correction section, and outputting a frame loss signal when the frequency of errors exceed a frame loss threshold value.

Accordingly, the synchronization guard section can identify from the frame loss signals that error generation frequency is higher than the threshold value. Therefore, it considers that frame loss has occurred, and can immediately transfer the operation to adjusting for frame synchronization.

Instead of the frame loss detection section, a frame synchronization detection section may be provided in each transmission channel for detecting a frequency of errors generated in each transmission channel, based on error signals output from the error correction section, and outputting a frame synchronization signal when the frequency of errors exceed a frame synchronization threshold value.

Accordingly, the synchronization guard section can identify from the frame synchronization signals that error generation frequency is less than the threshold value. Therefore, it considers that frame synchronization is appropriate, and can immediately transfer the operation to renewing the skewing amount.

BRIEF DESCRIPTION OF THE DRAWINGS

FIG. 19 is a time chart showing the operation of the master channel frame sync circuit 30.

DESCRIPTION OF THE PREFERRED EMBODIMENTS

The following embodiments are not meant to limit the invention disclosed in the claims, and it should be noted that all the combinations of the features presented in various embodiments are not necessarily essential as solution means of the invention.

1. Parallel Redundancy Encoder

Before explaining an embodiment of the channel-to-channel skew compensation apparatus of the present invention, the role of the parallel redundancy encoder for outputting encoded parallel data to the channel-to-channel skew compensation apparatus will be explained.

Figure 1:
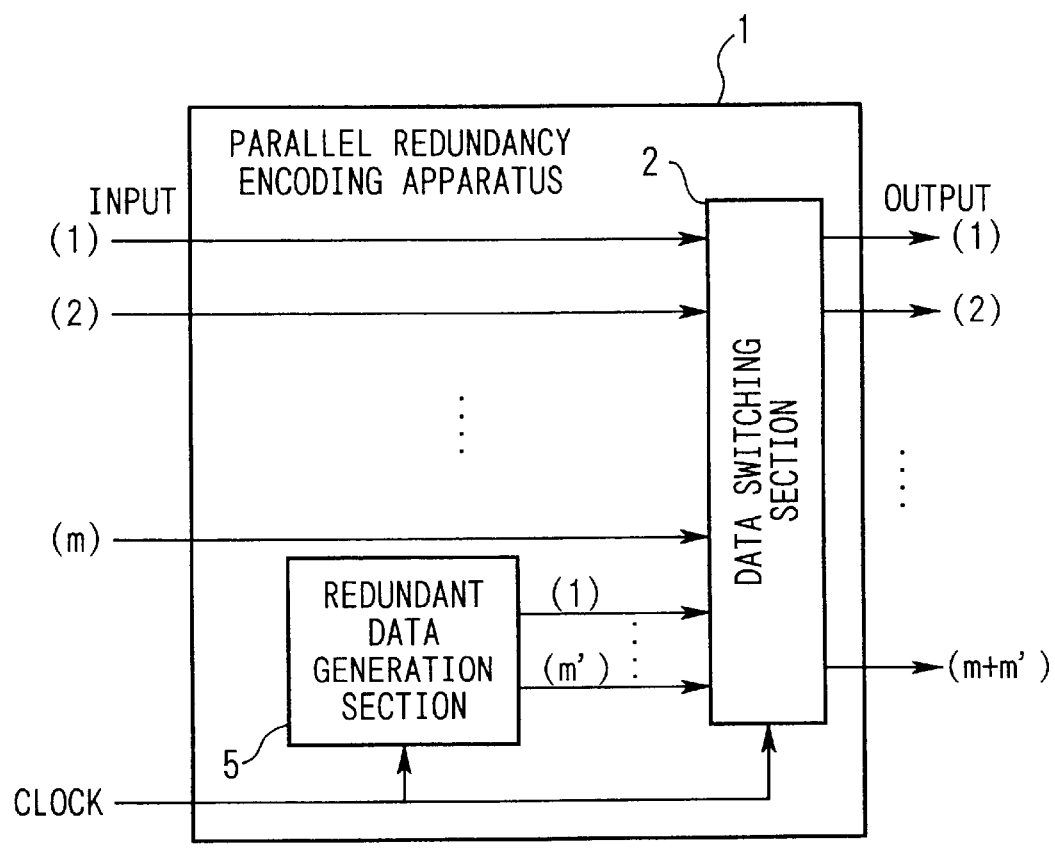
FIG. 1 is a diagram showing a general configuration of the parallel redundancy encoder.

FIG. 1 shows a diagram of a general configuration of the parallel redundancy encoder 1 provided with a redundancy generation section 5 and a data switching section 2. Parallel data of m-channels are input, in synchronization with the clock pulses, into the respective channels of the parallel redundancy encoder 1. This m-channel parallel input data may also be error correction encoded data to enable detection and correction of data errors in the parallel data at the receiver-side.

Redundancy generation section 5 outputs m'-channels of redundant data. M-channels of parallel data and m'-channels of redundant data are input into a data switching section 2. Data switching section 2 monitors output data, over a period of m+m' clock-pulses, and makes certain that every channel (from channel 1 to channel m) contains m'-clock duration of redundant data, and, in the following m+m' clock duration, current output pattern of redundant data is the same as the preceding pattern during the preceding m+m' clock duration, by switching the data in each channel and outputting m+m' channels of data.

The result is that the output data from data switching section 2 contains m' bits of redundant data inserted for every m+m' bits, and all the m channels of data are output at all times. Thus, because encoding is carried out by switching the data, the bit speed of the data output to transmission path is the same as the bit speed of input data. Therefore, the parallel redundancy encoder can be operated with one type of clock signal.

Using the parallel redundancy encoder described above, because redundant data can be deleted by switching data so that speed conversion circuit becomes unnecessary, it enables to provide a parallel redundancy encoder of a simple structure and adaptable to different data speeds. Several such parallel redundancy encoders, each represented by "a", can be arranged in parallel so that a×m channels of parallel data and a×m' channels of redundant data can be switched at m+m' clock cycle to obtain the same result.

Figure 2:
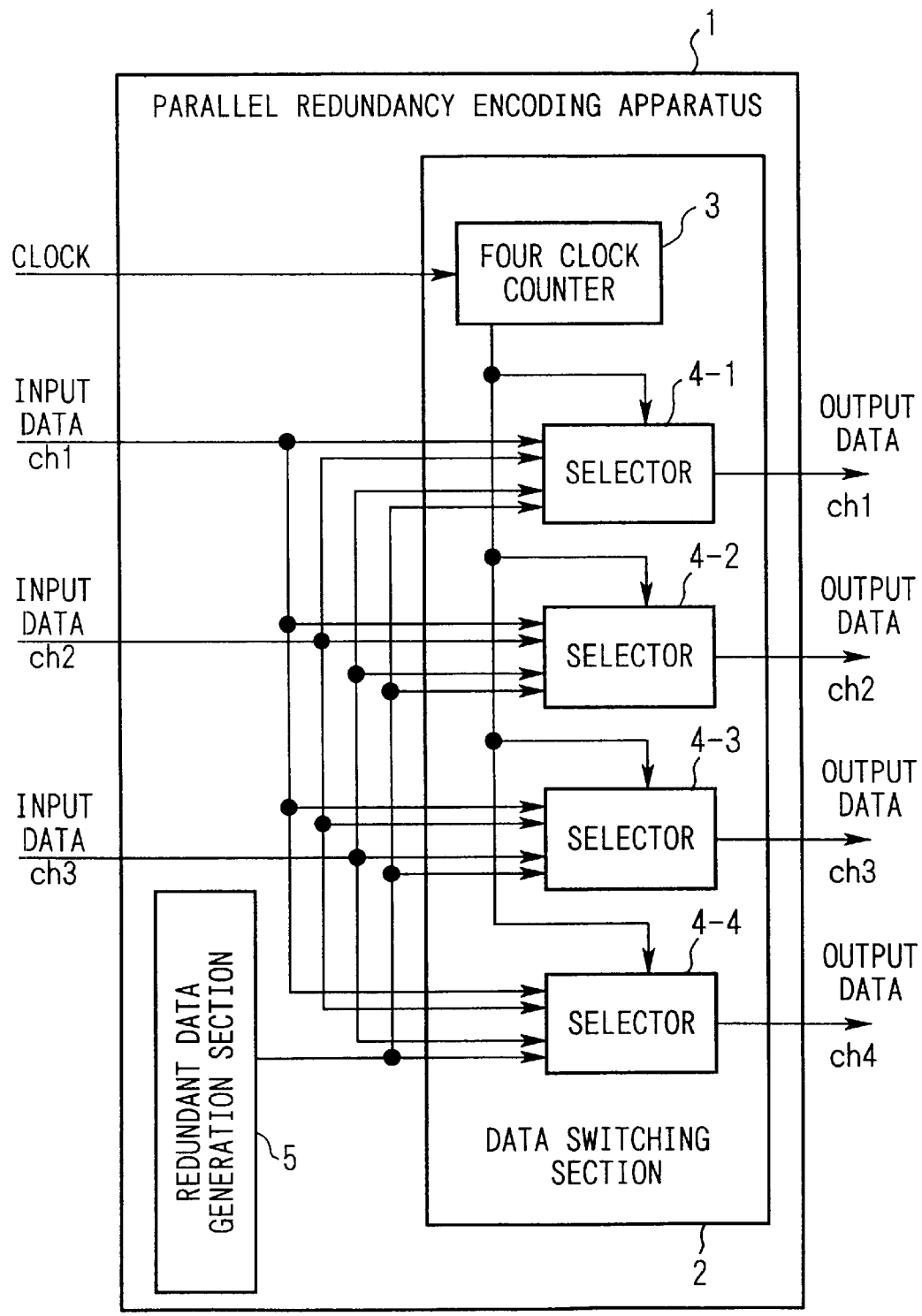
FIG. 2 is a block diagram of an embodiment of a parallel redundancy encoder of the present invention for m=3 and m'=1.

Specific examples of using the parallel redundancy encoder 1 will be explained below. FIG. 2 is a block diagram of a parallel redundancy encoder for m+3 and m'=1. Data switching section 2 is comprised by a 4-clocks counter 3 and four selectors 4-1~4-4. Selectors 4-1~4-4 respectively receive input data in three channels ch1~ch3 and redundant data (a frame bit F) in one redundancy channel, switches the four groups of input data according to clock signals from the 4-clocks counter 3, and outputs data from four channels. Each of the four selectors 4-1~4-4 are operated so as not to select a common input bit at the same time.

Figure 3:
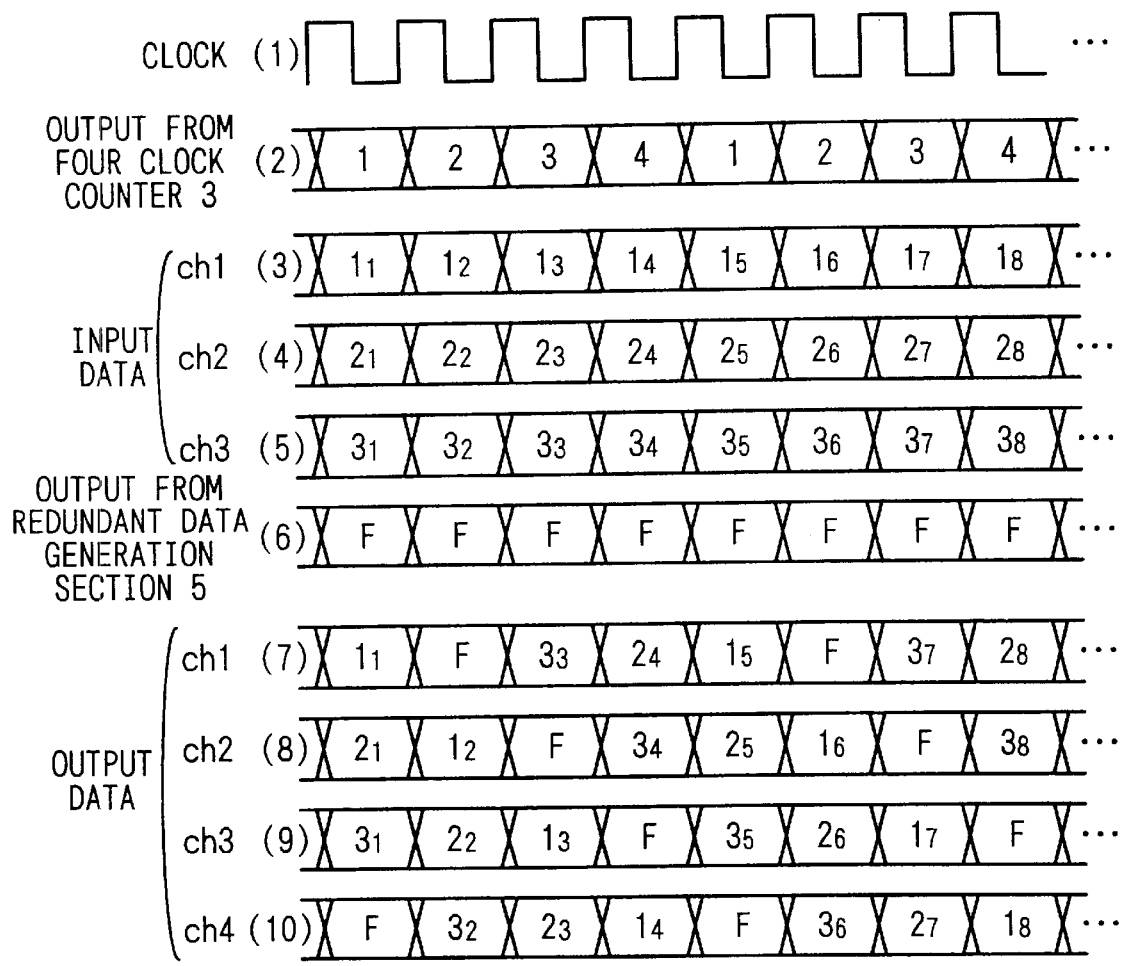
FIG. 3 is a time chart for various operations of the parallel redundancy encoder.

FIG. 3 is a time chart for operation of the parallel redundancy encoder shown in FIG. 2. Operation of the parallel redundancy encoder will be explained with reference to FIG. 3. In FIG. 3, (1) refers to clock signals; (2) to output signals from the 4-clocks counter 3; (3)~(5) to respective input data signals in ch1~ch3; (6) to output signals from redundancy generation section 5; and (7)~(10) to respective output signals from ch1~ch4.

The 4-clocks counter 3, increments the output by one for each one clock pulse starting from [1], and at the fifth clock pulse, the output returns to [1]. Input data in ch1 is synchronized with the clock signals, and as shown in (3), first clock signal triggers an input of data $1_1$, second clock signal inputs data $1_2$, and the "n"th clock signal inputs data $1_n$. Same patterns are repeated for other channels ch2, ch3.

Selector 4-1 responds to output signals [1]~[4] from the 4-clocks counter 3 and outputs data ch1~ch3 and a frame bit F by switching among the four input channels. The results is a train of bits output from ch1 as shown in (7). Selectors 4-2, 4-3 and 4-4 operate in the same manner, according to output signals [1]~[4] from the four-clocks counter 3 to generate output bit train patterns shown in (8)~(10).

The resulting output patterns show that the output data from any one channel has one frame bit F (of one bit) inserted at every fourth bit, so that each frame is constituted by a four-bit length. Examining the output data at a particular time slot, it will be noticed that the output data from ch1~ch3 are consistent in the same time slot, except for the redundancy channel outputting a redundant bit F.

By adopting such a construction, a counter and selectors are all that are necessary to perform a task of inserting a frame bit F. Therefore, the need for PLL circuit for clock speed conversion is eliminated, so that the circuit configuration becomes simplified, thereby enabling to provide an encoding circuit that does not require adjusting to a particular operational speed. Furthermore, data input into three channels are all output at the same time-slot so that insertion of a frame bit does not cause any temporary delay in data transmission.

Also, in general, optical skewing is produced depending on the magnitude of a mark factor (a ratio of "0" to "1" in data being transmitted), so that a biased mark factor between channels is a cause of generating channel-to-channel skewing. In view of this consideration, it can be seen that encoding is the same in all the channels at the output-side, because the parallel redundancy encoder presented above switches input data in such a way that all the data on the output-side of the channels including the redundant data are uniformly switched, thereby making the mark factor in each channel uniform. This means that data symmetry is high in all the outgoing channels, thus preventing the generation of channel-to-channel skewing caused by mark factor biasing and leading to an expectation of scramble effects.

Furthermore, decoding circuit can also be constructed using only a counter and selectors so that decoding circuit configuration can be simplified, and data delay caused by frame deletion can be avoided. Another advantage is that, because all the channels are subjected to the same encoding process, same frame synchronization circuit can be used in all the channels to lead to highly symmetrical encoding/decoding circuitries.

2. Channel-to-Channel Skew Compensation Apparatus

Next, channel-to-channel skew compensation apparatus will be explained with reference to the drawings.

2-1. Embodiment 1

Figure 4:
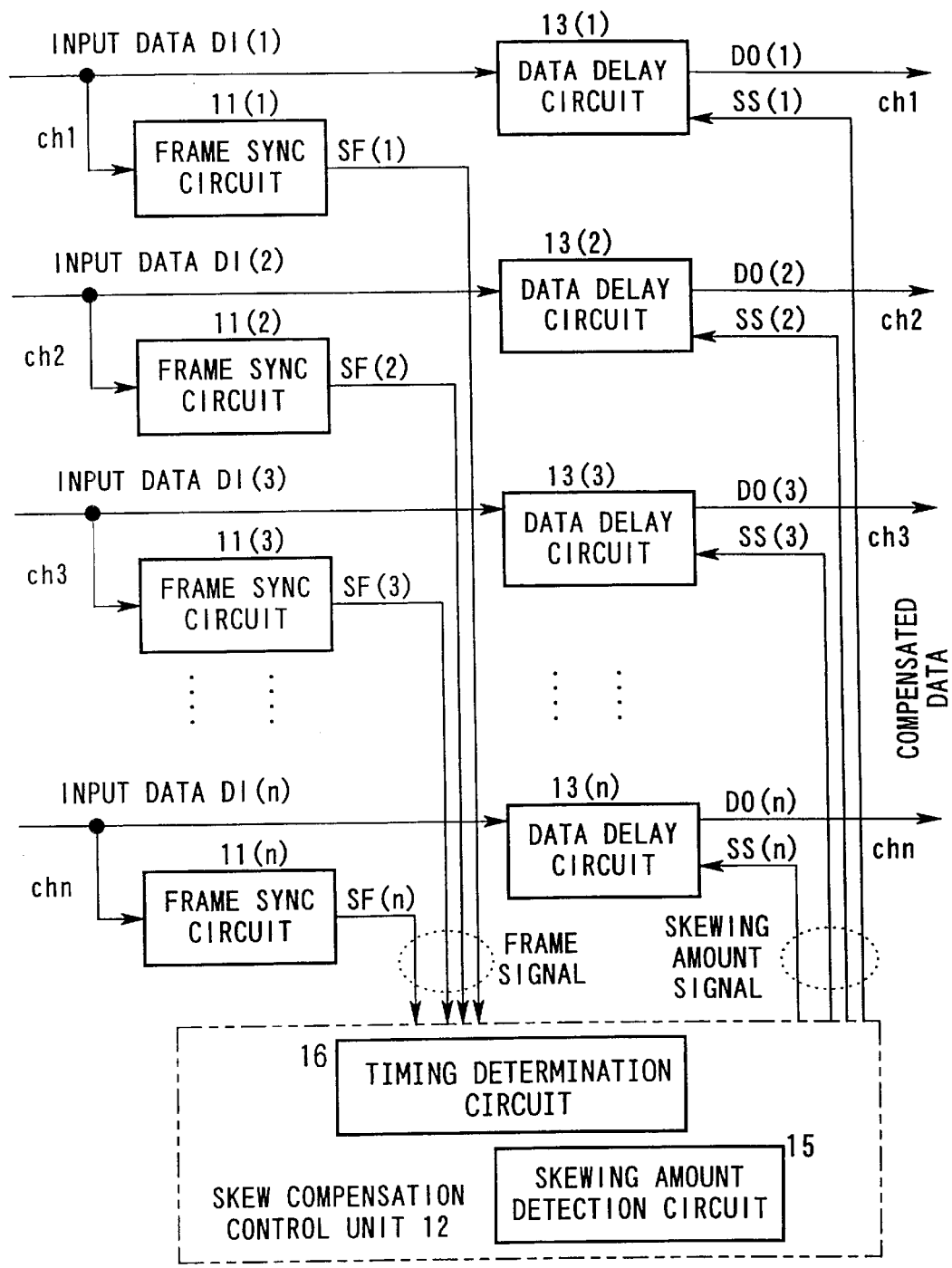
FIG. 4 is a block diagram of a first embodiment of the channel-to-channel skew compensation apparatus.
Figure 5:
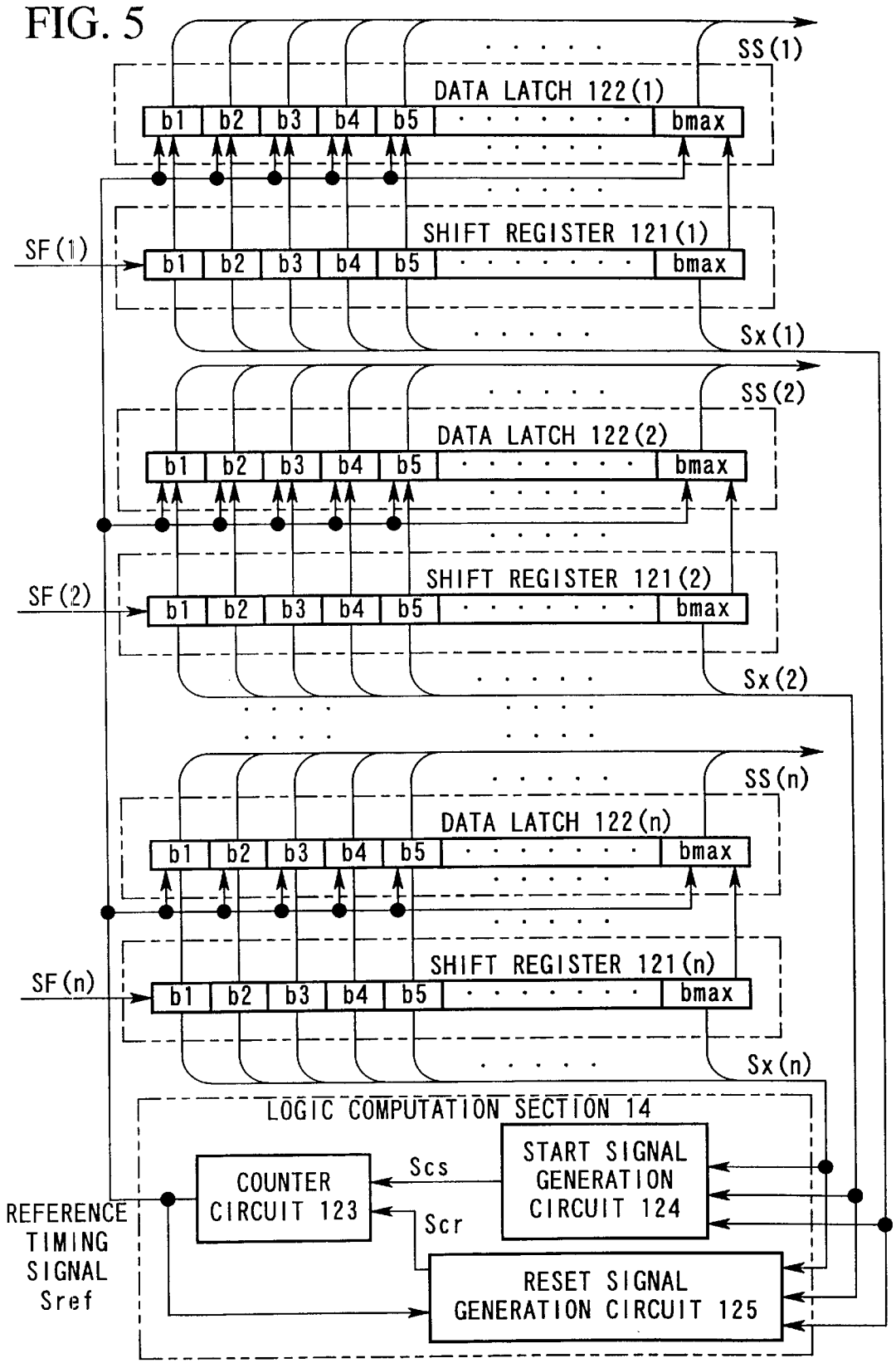
FIG. 5 is a block diagram of the skew compensation control unit 12 shown in FIG. 4.
Figure 6:
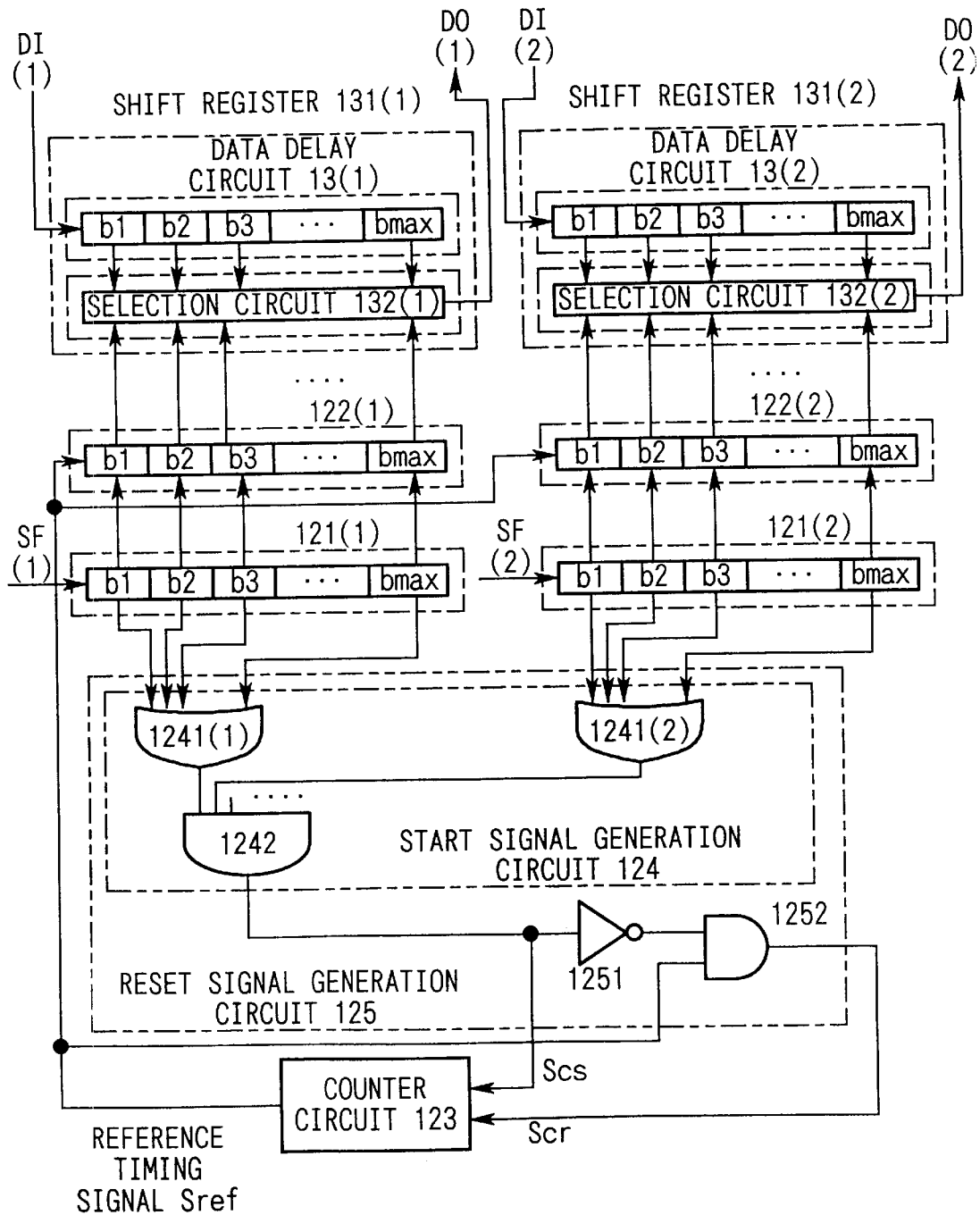
FIG. 6 is a block diagram of the main sections of the skew compensation apparatus shown in FIG. 4.
Figure 7:
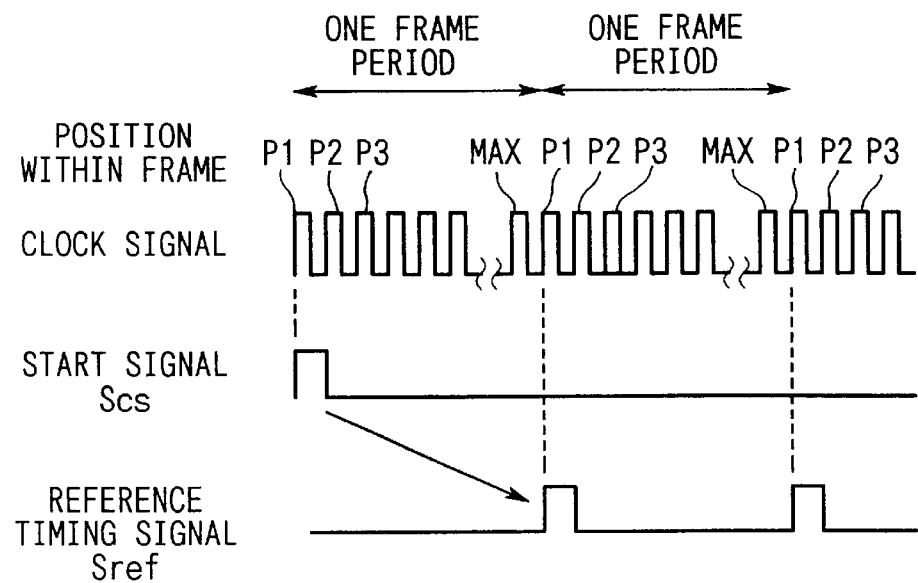
FIG. 7 is a time chart showing the operation of counter 123 responding to a start signal Scs.
Figure 8:
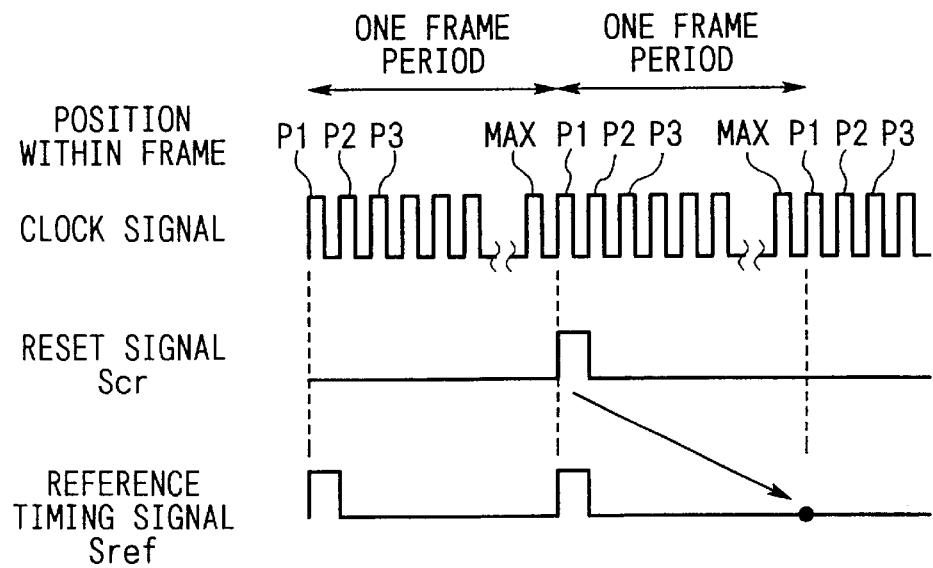
FIG. 8 is a time chart showing the operation of counter 123 responding to a reset signal Scr.

FIGS. 4–8 show the structures and operation of the channel-to-channel skew compensation apparatus. FIG. 4 is a block diagram of the channel-to-channel skew compensation apparatus. FIG. 5 is a block diagram of the configuration of the skew compensation control unit 12 shown in FIG. 4. FIG. 6 is a block diagram of the main sections of the skew compensation apparatus shown in FIG. 4. FIG. 7 is a time chart showing the operation of a counter circuit 123 responding to a start signal Scs. FIG. 8 is a time chart showing the operation of counter circuit 123 responding to a reset signal Scr.

The channel-to-channel skew compensation apparatus shown in FIG. 4 compensates channel-to-channel skewing of parallel data DI(1), DI(2), DI(3), . . . , DI(n) input into "n" number of channels ch1, ch2, ch3, . . . , chn, and outputs output data DO(1), DO(2), DO(3), . . . , DO(n) from each channel.

In this embodiment, it is presumed that the data transmitted through a parallel interconnection system are encoded at the sender-side so that the input data DI will have the same frame length in all the channels. Also, although not shown in the drawing, input data in each channel are bit synchronized in all stages of the channel-to-channel skew compensation apparatus and are input in synchronization with the clock signal. Clock signal period is common to all the circuits.

As shown in FIG. 4, the channel-to-channel compensation apparatus includes a frame sync circuit 11 and a data delay circuit 13 for each of the n channels and a skew compensation control unit 12 for the overall apparatus.

In the following explanations and drawings, a common reference numeral is used for a plurality of elements having the same structure. However, when it is necessary to distinguish the channels having an element, each reference numeral is accompanied by a symbol to indicate a particular channel inside the brackets. Signals in various circuits are treated in the same manner.

Skew compensation control unit 12 includes a timing determination circuit 16 and a skewing amount detection circuit 15. Frame sync circuit 11 synchronizes each input signal (input data DI) input into respective channels of the channel-to-channel skew compensation apparatus, and outputs corresponding synchronized frame signals SF.

Input data DI are serial signals, and are divided into a pre-determined frame length before inputting. For each division of frames, frame sync circuit (sync circuit) 11 detects the position of each frame on the time axis, i.e. its arrival timing. A frame signal SF output by the frame sync circuit 11 is a type of sync signal, and is output as a pulse at a timing determined by the detected positions of the frames.

When channel-to-channel skewing is generated, the arrival times for the input data DI(1)~DI(n) are shifted relative to the other, therefore, differences in the timing of pulses appearing in the frame signals SF(1)~SF(n) are generated in each channel.

Skew compensation control unit 12 compares frame signals SF(1)~SF(n) in all the channels, and identifies skewing amount in respective channels. Amount of channel-to-channel skewing is caused by relative shifts in the data positions, so that a reference timing is required for determining the skewing amount. Because there is no master channel in the present skew compensation apparatus, timing determination circuit 16 decides the reference timing for judging the skewing amount for the frame signals SF(1)~SF(n) in all the channels.

Skewing amount detection circuit 15 detects a skewing amount SS(1)~SS(n) in each channel based on the timing selected by the timing determination circuit 16. Each skewing amount SS(1)~SS(n) is impressed into each data delay circuit 13 in the respective channels as the skewing amount to be controlled. Data delay circuit 13 in each channel and receives the skewing amount SS output by the skew compensation control unit 12, and adjusts the amount of data delay in each channel so as to adjust frame positions of the data in all the channels.

Internal structure of the skew compensation control unit 12 is shown in FIG. 5. In this drawing, internal structure for only three channels, ch1, ch2 and chn, are shown, but those channels which are not shown have the same structure as ch1, ch2 and chn. In addition, the shift registers 121(1)~121(n) and the logic computation section 14 are included in the timing determination circuit 16 shown in FIG. 4. Frame signals SF input by the frame sync circuit 11 shown in FIG. 4 are input into a shift register 121 provided in each channel. Each shift register 121 can hold [bmax bits] of data.

Shift register 121 is impressed with a constant periodic clock signal for holding the input frame signal FS and shifting the bit position, but the signal line for the clock signal is omitted in FIG. 5. A frame signal SF impressed on the input terminal of the shift register 121 is held in the first bit [b1] in synchronization with the clock signal. When a pulse appears in the clock signal, the retained frame signal SF shifts successively to each bit position [b2], [b3], [b4], . . . , [bmax].

Maximum number of bits [bmax] for the shift register 121 is determined freely within the number of bits equal to the frame length of input data DI. When the maximum number of bits [bmax] is increased, the range of possible amount of skew compensation is also increased. In other words, channel-to-channel skew compensation is possible within a range of numbers of bits given by [bmax] less [1] and a duration TC governed by the period of the clock signal.

During an interval of time from the appearance of one bit of SF signal over the duration TC, this frame signal SF will be held in one of the bit positions [b1]~[bmax] in the shift register 121. It is therefore possible to identify the relative positions of the bits on the time axis from the bit position of the frame signals SF held in the shift register 121.

In other words, when all the channels in the shift register 121 is holding the frame signal SF in any of the bit positions [b1]~[bmax], it is possible to determine differences in arrival times of the frame signal SF based on the bit position of the frame signal SF held in the shift register 121. From the bit position of the frame signal SF among the different channels, it is possible to determine the amount of channel-to-channel skewing based on differences in the appearance time of frame signals SF.

It is possible that the amount of channel-to-channel skewing varies as time passes, depending on changes in the conditions of various transmission paths. Therefore, it is desirable to periodically check channel-to-channel skewing so that channel-to-channel skewing can be compensated even if the channel-to-channel skewing varies. When processing data have a constant frame length, data are repeatedly entered at a constant frame input rate. For this reason, a counter circuit 123 is used to check the amount of skewing in this embodiment by outputting a reference timing signal Sref repeatedly for each frame. As shown in FIG. 7, counter circuit 123 counts clock signals while performing channel-to-channel skew compensation, and outputs a reference timing signal Sref at the end of each frame.

Reference timing used to check the amount of skewing is determined by the start signal generation circuit 124. That is, when the start signal generation circuit 124 shown in FIG. 7 outputs a start signal (a pulse signal) Scs, the counter circuit 123 outputs a reference timing signal (a pulse signal) Sref at the end of every frame period.

Also, a reset signal generation circuit 125 is provided in the logic computation section 14 to stop the operation of the counter circuit 123. When the reset signal generation circuit 125 outputs a pulse of reset signal Scr, it stops generation of reference timing signal Sref, as shown in FIG. 8.

Here, in FIGS. 7 and 8, the frame length in input data DI (frame period) is equal to the pulsing period of the clock signal multiplied by the [MAX] number of bits.

As shown in FIG. 5, the reference timing signal Sref output by the logic computation section 14 is impressed as a control signal on data latch 122 in each channel. When a pulse of reference timing signal Sref appears (when changed from low level to high level), data latch 122 in each channel latches and holds input data.

Data latch 122 in each channel can hold [bmax] bits of data. Input terminal of the data latch 122 is connected to output terminal of the shift register 121. Therefore, the data latch 122 memorizes a total number of bits ([b1]~[bmax]) held in the shift register 121.

In each channel, a frame signal SF is included in some bit positions of the data memorized in the data latch 122. Also, these bit positions in the data latch 122 correspond to positions on the time axis of the frame signal SF in each channel. Therefore, when there is channel-to-channel skewing in input data DI, data delay times may be adjusted according to the data memorized in data latch 122 to eliminate shifts in data positions (times) from channel to channel. In other words, data memorized in the data latch 122 can be utilized as skewing amount signal SS.

As shown in FIG. 5, all the output signals Sx(1)~Sx(n) for all the bits in the shift registers 121 are input into the start signal generation circuit 124. Based on these signals, start signal generation circuit 124 outputs start signals Scs. Also, all the output signals Sx(1)~Sx(n) for all the bits in the shift registers 121 and the reference timing signals Sref output from the counter circuit 123 are input into the reset signal generation circuit 125. Based on these signals, reset signal generation circuit 125 outputs reset signals Scr.

Counter circuit 123 begins counting upon receiving a start signal Scs and stops counting upon receiving a reset signal Scr, as illustrated in FIGS. 7 and 8. Counter circuit 123 outputs reference timing signals Sref at a period to match the frame length. The contents of the shift registers 121 are transferred to data latch 122 at an output timing given by the reference timing signals Sref.

Data latch 122 in each channel, acting as the skewing amount signal SS for own channel, checks the location of the bit position holding the frame signal SF. For example, if the reference bit position is selected to be "m+1"th bit position, and if the frame signal SF is detected at the "m"th bit holding position in the data latch 122, the skewing amount in that channel is judged to be a one-bit-delay. If the frame signal SF is detected at the "m+5"th bit holding position in another channel, the skewing amount in that channel is judged to be a four-bit-advance.

Start signal generation circuit 124 outputs a start signal Scs when frame signals SF in all the channels are held inside the shift register 121. When all the frame signals, from a frame signal having the least amount of delay to the frame signal having the maximum amount of delay, are held in the shift registers 121 of each channel, upon cueing by the start signal Scs, counting action by the counter circuit 123 is started.

When skewing amount fluctuates, there is a possibility of finding a channel in which the frame signal SF is not held in the shift register 121 when the reference timing signal is active (at high level). In such a case, skewing amount in a channel not holding the frame signal SF cannot be determined in the normal manner. When a channel is found that has no frame signal SF in the shift register while the reference timing signal Sref is active, the reset signal generation circuit 125 outputs a reset signal Scr. When the reset signal Scr is received, the counter circuit 123 stops counting and waits for an input of a start signal Scs.

When all the frame signals SF are held in respective shift registers 121, a start signal Scs is output, and the counter circuit 123 starts counting, and normal skew compensation operation can be started. Data delay circuit 13 adjusts data delay amount in each channel according to skewing amount signals SS output by respective data latch 122, thereby compensating channel-to-channel skewing.

The present channel-to-channel skew compensation apparatus produces an independent compensation action for skewing in each channel, and therefore, when a skewing amount is changed in any channel, change in the skew amount signal SS is limited only to the channel in which skewing amount is changed. Another feature is that the maximum value of skewing amount which can be compensated is (bmax–1) bits when the number of bits in the shift register 121 is [bmax]. This means that a relatively large amount of skew compensation, in comparison to the number of bits in the shift register 121 and others, can be provided.

As illustrated in FIG. 6, the signal conditions of all the bits output from the shift register 121 are monitored by the start signal generation circuit 124 and the reset signal generation circuit 125. That is, signals of all the bits ([bmax] bits) output from the first shift register 121(1) are input into or-gate 1241(1) while signals of all the bits output from the second shift register 121(2) are input into or-gate 1241(2) inside the start signal generation circuit 124.

Also, output signals from or-gate 1241 for all the channels are input into and-gate 1242. If the frame signal SF is held in any of the bit positions in the shift register 121, output of or-gate 1241 becomes active (high level). And, frame signals SF in all the channels are held in any of the bits in respective shift registers 121, output of and-gate 1242 becomes active (high level).

Output of and-gate 1242 is impressed on the counter circuit 124 as the start signal Scs. In other words, when frame signals SF in all the channels are held in respective shift registers 121, counter circuit 123 starts counting. As shown in FIG. 7, the counter circuit 123 repeatedly outputs reference timing signals at the same timing as the frame period. In synchronization with the reference timing signal Sref, content of each shift register 121 is transferred to the respective data latch 122.

Output bits from data latch 122 are input into data delay circuit 13 as the skewing amount signal SS. As shown in FIG. 6, each data delay circuit 13 is comprised by a shift registers 131 for data delaying purpose and a selection circuit 132. Data delaying shift register 131 shifts input data DI input into each channel of the channel-to-channel skew compensation apparatus one bit at a time for each pulse of the clock signal (signal line for the clock signal is omitted).

When the frame signal SF is held in a "k"th bit (k is a natural number less than [bmax] in the data holding circuit 122, i.e., "k"th skewing amount signal is active, the selection circuit 132 outputs data at the "k"th bit of the data delaying shift register 131. Therefore, for the channel with the maximum amount of transfer delay, the frame signal SF is held in the first bit in the data latch 122, and the data in the first bit of the data delaying shift register 131 are output as output data DO from the data delaying circuit 13.

If a channel contains data that is delayed by j clocks 0 is a natural number less than [bmax]−1), in comparison with the maximum delay channel, the frame signal SF is held in "j+1"th bit in the data latch 122, and output data DO is latched from "j+1"th bit in the shift register 131. Therefore, data having an added delay amount equal to j clocks, in comparison with the maximum delay channel, becomes the output data. Channel-to-channel skewing is thus removed from the output data from the channel-to-channel skew compensation apparatus.

When skewing fluctuates, there is a possibility of finding a channel in which the frame signal SF is not held in the shift register 121 when the reference timing signal is active (at high level). For example, if the delay amount is further increased in the maximum delay channel, there may be a case in which frame signal SF may not be held in the shift register 121 even if the reference timing signal Sref becomes active. In such a case, skewing amount signal SS is not output from the channel not having the frame signal SF so that skew compensation cannot be carried out in the normal manner.

If a channel not having the frame signal SF is generated when the counter signal is active, the reset signal generation circuit 125 sends a reset signal Scr to the counter circuit 123, and resets the counter circuit 123. After resetting, if the shift registers 121 in all the channels hold a SF signal, start signal generation circuit 124 sends a start signal Scs to the counter circuit 123, which re-starts counting to return to normal skew compensation action.

Operation of the reset signal generation circuit 125 will be explained in detail in the following. In this embodiment, reset signal generation circuit 125 has an internal start signal generation circuit 124. In other words, start signal generation circuit 124 shares certain functional elements with reset signal generation circuit 125. Functional aspects of the structure is not different from those shown in FIG. 5.

Figure 9:
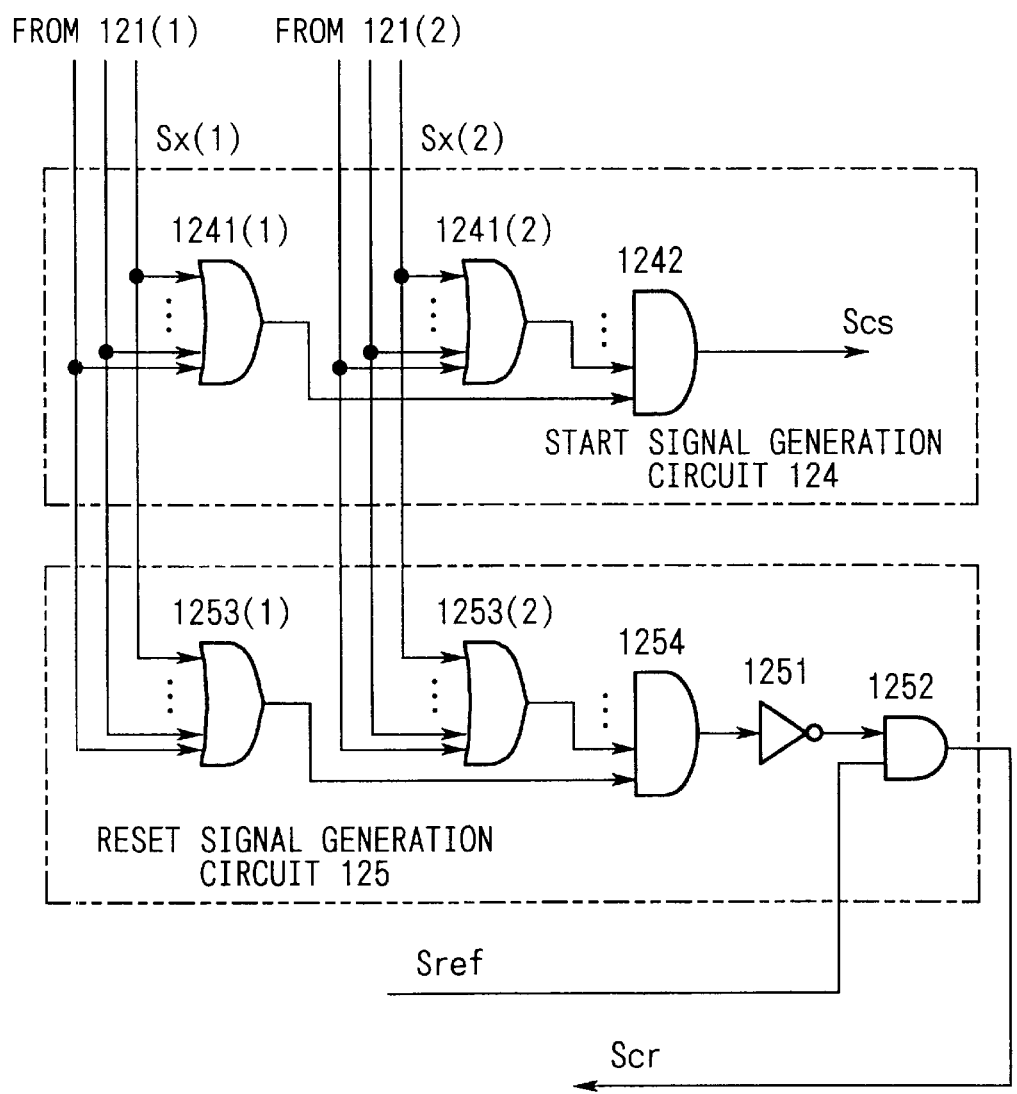
FIG. 9 is a block diagram of a variation of the timing determination circuit 16 shown in FIG. 4.

When the start signal generation circuit 124 and reset signal generation circuit 125 are provided independently of the other, a variation configuration shown in FIG. 9 may be used. If the frame signal SF is held in the shift register 121, the output of or-gate 1241 becomes active. N pieces of data output from or-gate 1241 are input into and-gate 1242.

When the shift registers 121 in all the channels hold SF signals, output of and-gate 1242 becomes active. Output of and-gate 1242 is inverted in the inverter 1251 and is impressed on the and-gate 1252. Output of an inverter 1251 becomes active when there are more than one channel not having the frame signal SF the shift register 121.

Output of inverter 1251 and reference timing signal Sref are impressed on the input of and-gate 1252, so that when the reference timing signal Sref is active and a channel not having the frame signal SF is not held in the register 121 is found, reset signal Scr becomes active, and the counter circuit 123 is reset.

As explained above, master channel is deleted in this embodiment, and skewing is judged according to reference timing signal Sref output by the counter circuit 123 so that delay amount adjustment in the four data delay circuits 13 is limited to the channel that is experiencing skewing fluctuation regardless of what channel it is generated in.

Also, delay circuit with [bmax] number of bits, all skewing of less than ([bmax]−1) bits can be compensated using the present skew compensation apparatus. Further, by changing the bit numbers contained in shift register 121, data latch 122 and data delay shift register 131, skewing amount that can be compensated by the apparatus may include any number of bits (times) up to 1 clock time shorter than one frame length.

2-2 Embodiment 2

Figure 10:
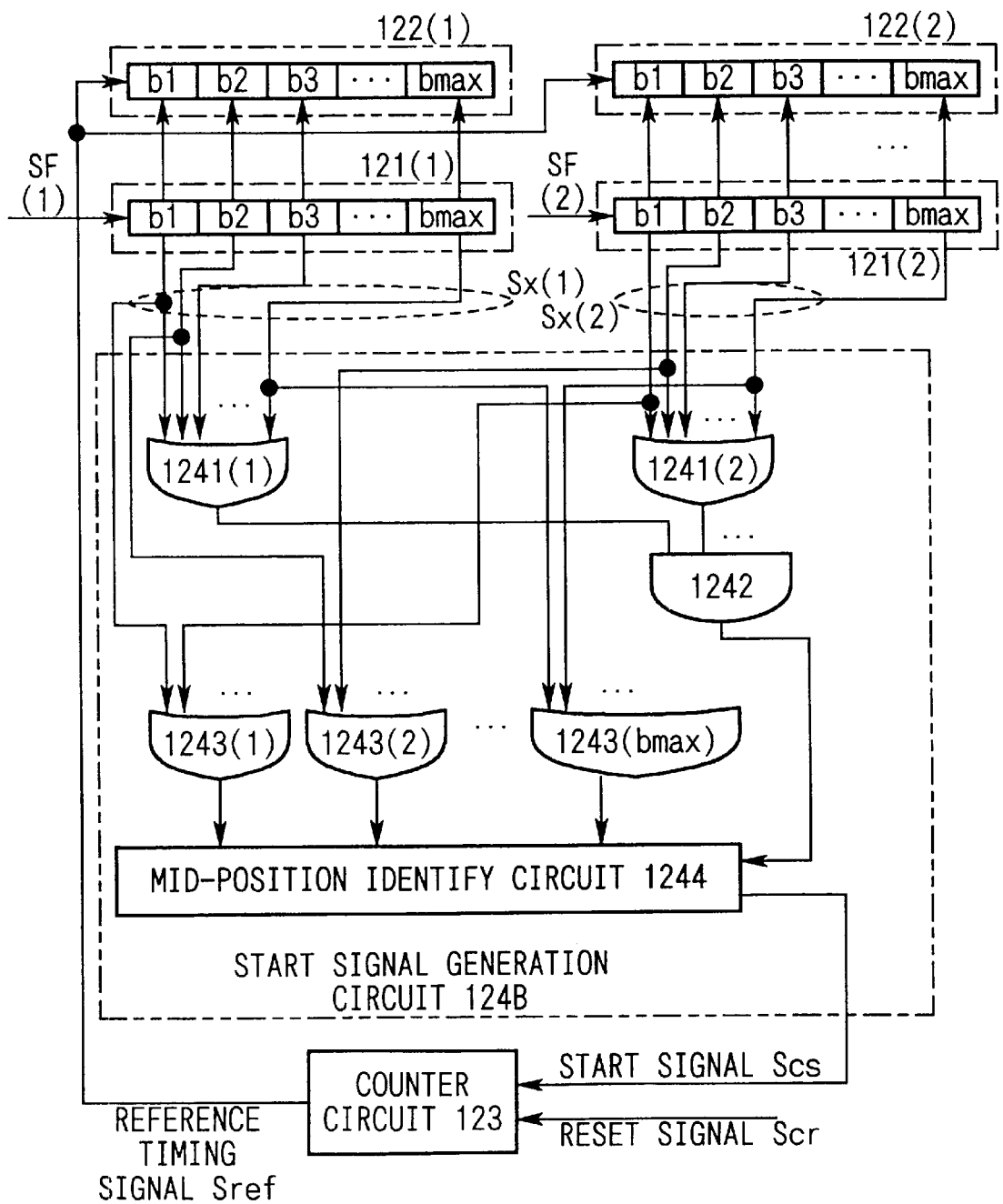
FIG. 10 is a block diagram of the configuration of the start signal generator 124B in a second embodiment of the channel-to-channel skew compensation apparatus.

In this embodiment, a start signal generation circuit 124B shown in FIG. 10 is used instead of the start signal generation circuit 124 used in Embodiment 1. Other components are the same as those in Embodiment 1.

The differences between Embodiments 1 and 2 will be explained in the following. Start signal generation circuit 124B has [bmax] pieces of or-gates 1243 and a mid-position identify circuit 1244. In this case, suffixes inside the brackets attached to the or-gate 1243 indicate bit-positions, not channels.

The output bits from the 1-position of shift registers 121 in all the channels are input into the first or-gate 1243(1). Similarly, the output bits from the 2-position~[bmax]-position from the shift registers 121 in all the channels are input into the corresponding 2nd-or-gate to [bmax]-or-gate 1243. Output signals from all the or-gates 1243 are input into the mid-position identify circuit 1244. Output signals from the and-gates 1242 are also input into the mid-position identify circuit 1244.

As explained in Embodiment 1, output signals from and-gates 1242 becomes active when a frame signal is held in the shift registers 121 in all the channels. When the output of the and-gate 1242 is active, the mid-position identify circuit 1244 selects a bit that is closest to the leading bit and a bit closest to the trailing bit from all the or-gates 1243 whose outputs are active, and when the mid-position between those bits arrives at the mid-point of the bit positions [b1]~[bmax] in the respective shift register 121, a start signal Scs is output.

For example, if the number of [bmax] bits is (2×m+1), where m is a natural number, a start signal Scs is generated when the mid-position between the leading and trailing bits reaches (m+1)th bit in the shift register 121. If the difference between the leading and trailing bits is an odd number, a start signal Scs may be output when the mid-position reaches between "m"th bit and "m+1"th bit or "m+1" bit and "m+2" bit in the shift register 121.

The result is that frame signals SF in all the channels are held in the shift registers 121, so that, when the mid-position frame between a frame closest to the leading end and another frame closest to the trailing end of all frame signals SF held in the shift registers 121 coincides with the mid-point of the shift registers 121, a start signal Sds is output from the start signal generation circuit 124.

In Embodiment 1, the start signal Scs is output to the counter circuit 123 when frame signals SF are held in the shift registers 121 in all the channels, therefore, if skewing amount fluctuates beyond the limit of the maximum delay channel, it is necessary to reset the counter circuit 123. On the other hand, in Embodiment 2, reference timing signal Sref is automatically adjusted so that the mid-point of the frame signals SF of skewed data coincides with the mid-point of the data latch 122. This technique is advantageous because the data latch 122 is more effectively used against skewing fluctuation, and there is less need for resetting the counter circuit 123.

2-3 Embodiment 3

Figure 11:
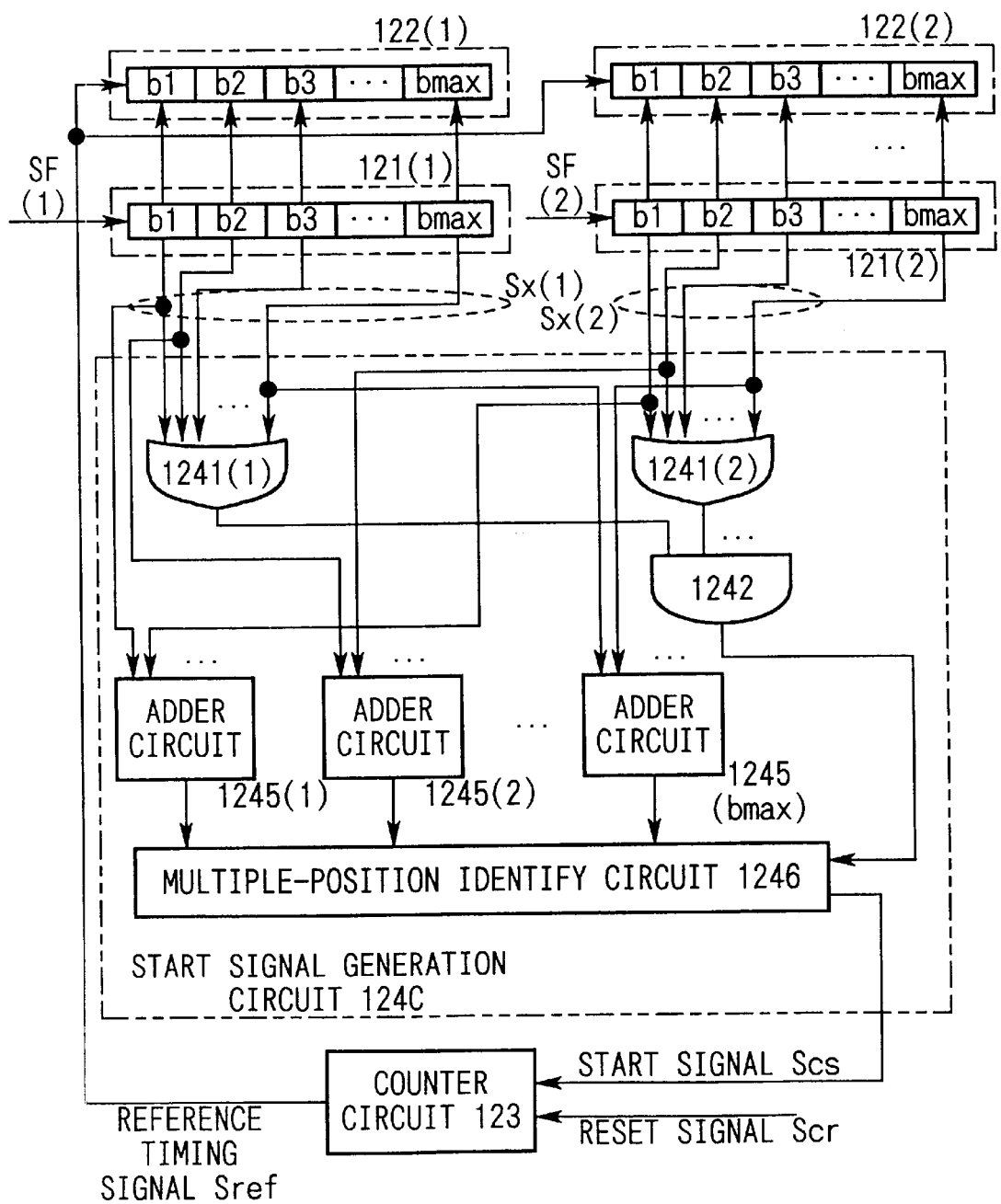
FIG. 11 is a block diagram of the configuration of the start signal generator 124C in a third embodiment of the channel-to-channel skew compensation apparatus.

In this embodiment, a start signal generation circuit 124C shown in FIG. 11 is used instead of the start signal generation circuit 124 used in Embodiment 1. Other components are the same as those in Embodiment 1. As shown in FIG. 11, the start signal generation circuit 124C is provided with [bmax] pieces of adder circuit 1245 and a multiple-position identify circuit 1246. The output bits from 1-position of the shift registers 121 in all the channels are input into the first adder circuit 1245 (1). Therefore, the adder circuit 1245 outputs a number of shift registers 121 that hold frame signal SF in the 1-position bit.

Similarly, the adder circuits 1245(2)~1245(bmax) correspondingly receive signals rom the 2-position bit to [bmax]-position bit in the shift registers 121 in all the channels, so that the number of shift registers 121 holding a frame signal SF in the respective bits is output from the adder circuit 1245. All the output signals from the adder circuit 1245 are input into the multiple-position identify circuit 1246.

Multiple-position identify circuit 1246 compares output of all the adder circuits 1245(1)~1245(bmax) when the output of and-gate 1242 is active. A start signal Scs is generated when the number output from the adder circuits 1245, assigned to the mid-position bit between the [1]~[bmax] bits, shows a maximum. That is, a start signals Scs is generated when frame signals SF are held in the shift registers 121 in all the channels, and the result of a comparison process yields a maximum. In effect, the comparison process waits for a situation to develop so that the number of channels holding the frame signals SF in the mid-position bit (between [1]-bit and [bmax]-bit) of the shift register 121 becomes higher than the number of channels holding frame signals SF in other bit-positions.

This technique is advantageous because of more effective utilization of the counter circuit 123. For example, if the skewing amount is considered to follow a statistical distribution involving the number of channels experiencing the fastest data delivery and those experiencing the slowest data delivery, it would be reasonable to assume that the number of channels experiencing some medium delay would be the most prevalent. Therefore, the start signal generation circuit 124C used in Embodiment 3 is adjusted such that the mid-point of the spread of skewing amount which is statistically distributed in a parallel data transfer system, coincides with the mid-position bit in the data latch 122. Therefore, data latch 122 is utilized in the most effective manner, thereby lessening the need for resetting the counter circuit 123.

2-4. Embodiment 4

Channel-to-channel skew compensation apparatuses which will be presented in the following embodiments are useful when the input parallel data are encoded so that errors in input parallel data are correctable. The apparatus checks for any errors in input data, and skew compensation is performed according to the results of checking. It is not necessary that correctably encoded parallel data are limited to those produced by the redundancy generation apparatus presented in the foregoing embodiments. The skew compensation apparatus presented below can process parallel data which have been frame encoded by other methods as well as parallel data output from any one of the channel-to-channel skew compensation apparatuses presented above.

Figure 12:
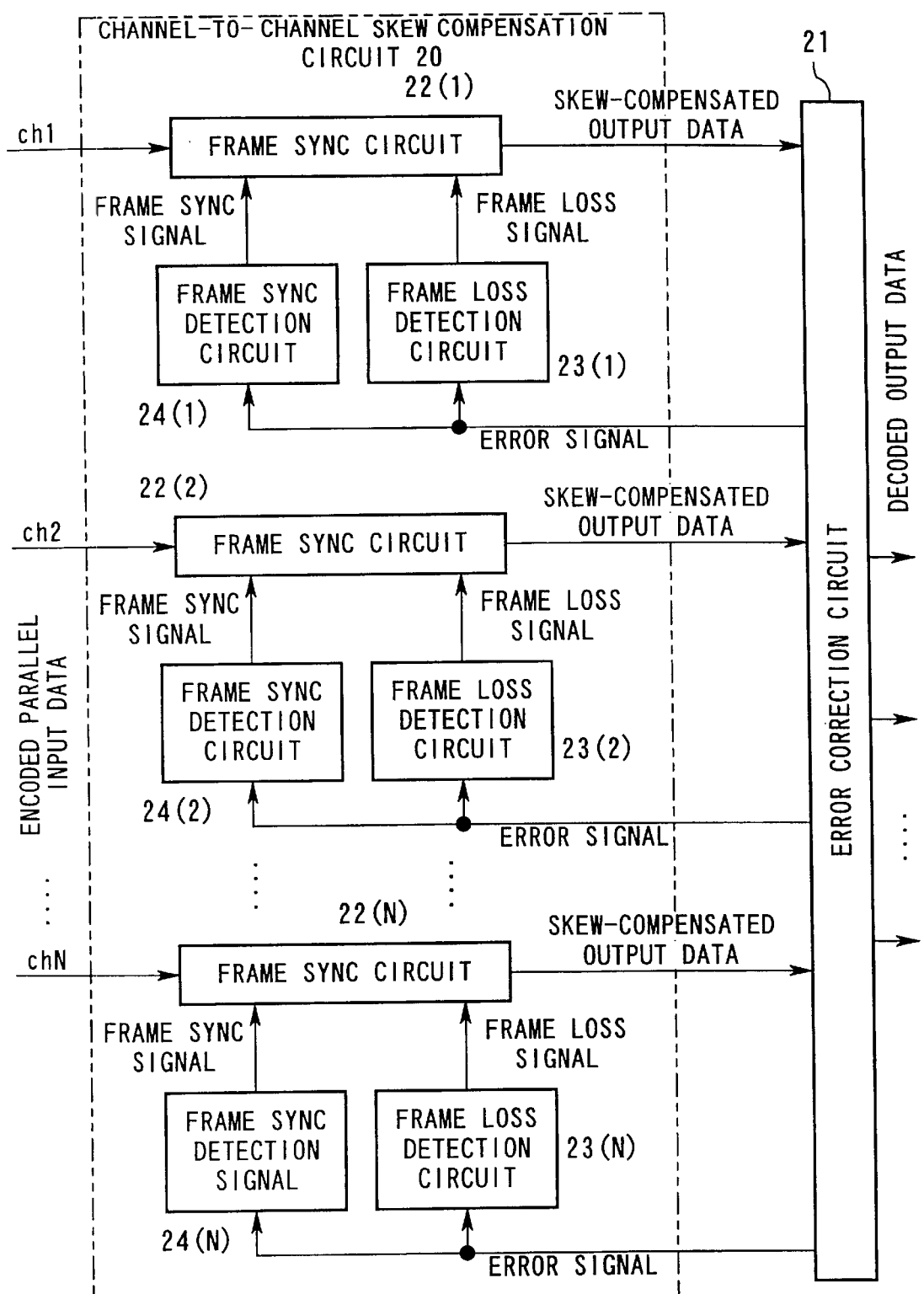
FIG. 12 a block diagram of the channel-to-channel compensation apparatus in a fourth embodiment.
Figure 13:
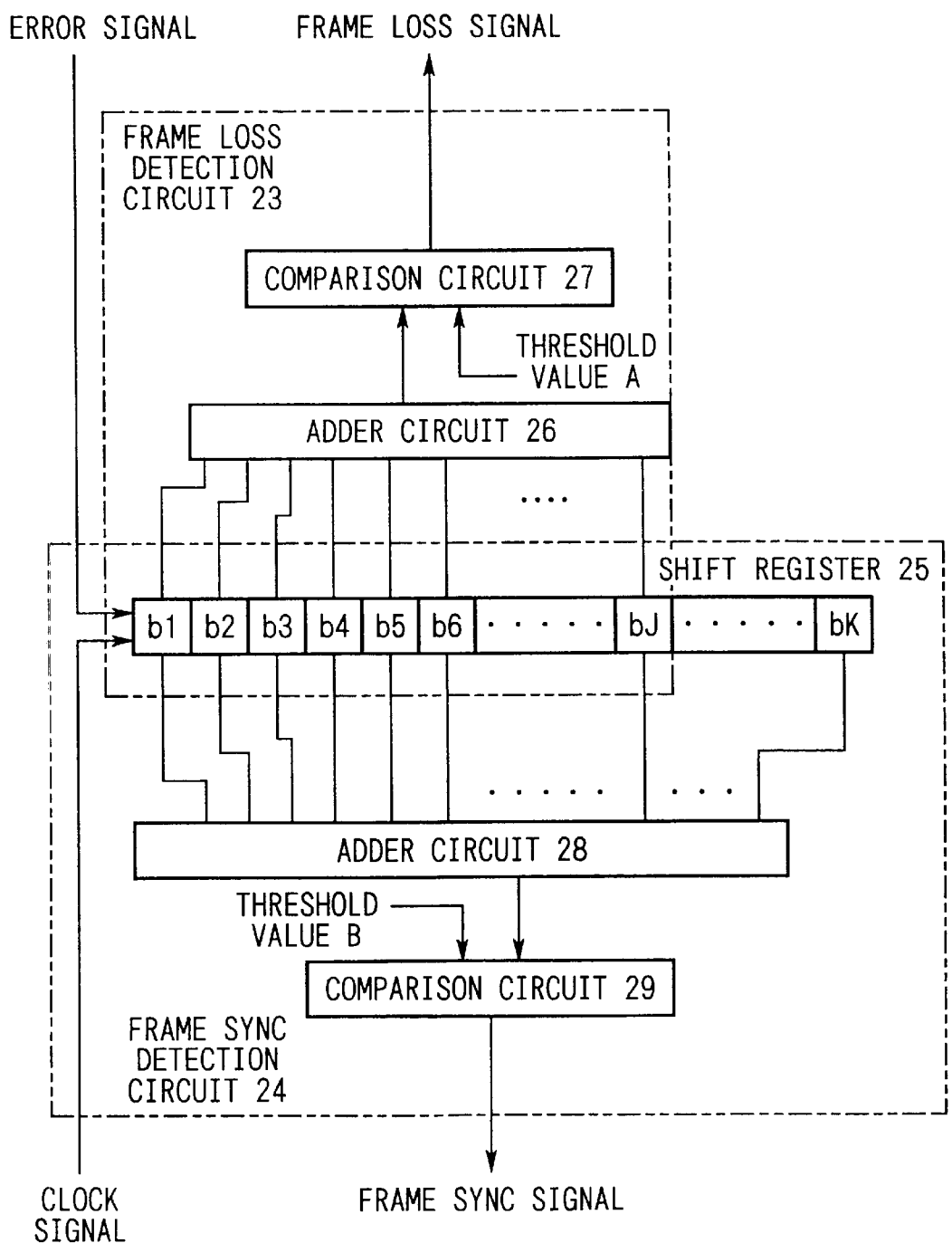
FIG. 13 is a block diagram showing the details of the frame out detection circuit 23 and frame synchronization detection circuit 24 shown in FIG. 12.

The structure of a channel-to-channel skew compensation apparatus in Embodiment 4 is shown in FIGS. 12 and 13. FIG. 12 is a block diagram of the apparatus and FIG. 13 is a block diagram showing the details of the frame loss detection circuit 23 and the frame sync detection circuit 24.

As shown in FIG. 12, this channel-to-channel skew compensation apparatus is comprised by a channel-to-channel skew compensation circuit 20 and an error correction circuit 21. Data input into the channel-to-channel skew compensation apparatus are binary data and are already error correction encoded and arranged in N parallel bits. N bits of parallel data passes through N channels of different transmission paths for each data, and are input into N channels ch1, ch2, . . . , chN, of channel-to-channel skew compensation circuit 20.

In the following presentation, those elements that are common to all the channels of the channel-to-channel skew compensation apparatus are referred to by the same reference numerals, and channel number is shown by a bracketed suffix.

Data input into each channel of the channel-to-channel skew compensation circuit 20 are synchronized in frame sync circuits 22(1)~22(N) provided in each of N channels, and are output so that the leading frame bits in all the channels are aligned. Error correction circuit 21 decodes the error correction coded N channels of data output from the channel-to-channel skew compensation circuit 20. Because encoding of the error correction codes removes redundant data components, the number of parallel bits is reduced. That is, output data from the error correction circuit 21 has N' bits (where N'<N).

Error correction circuit 21 detects errors in the output data from the channel-to-channel skew compensation circuit 20. Error correction circuit 21, upon detecting an error, outputs an error signal to the channel in which the error was detected. This error signal is a binary signal to show the presence or absence of errors, and is output for each bit moving in the time series direction of data. Error signal sent to a channel is input into a frame loss detection circuit 23(1~N) and a frame sync detection circuit 24(1~N), which are provided in each of N channels. As shown in FIG. 13, frame loss detection circuit 23 is comprised by a shift register 25, an adder circuit 26 and a comparison circuit 27, and the frame sync detection circuit 24 is comprised by the shared shift register 25, an adder circuit 28 and a comparison circuit 29.

Frame loss detection circuit 23 and frame sync detection circuit 24 share the same signals output from one shift register 25. Error signal and clock signal are input into the shift register 25. As shown in FIG. 13, shift register 25 has data bits [b1, b2, b3, . . . , bJ, . . . , bK] for holding data. In other words, shift register 25 can hold up to K bits of data, of which J bits are assigned to the frame loss detection circuit 23.

Whenever an error is found, the shift register 25 accepts an error signal triggered by a clock pulse, and shifts the data held in each bit position backwards. In other words, information contained in the error signal are successively held in the bit positions of b1, b2, b3, . . . , bJ, . . . , bK in the shift register 25. The clock signal input cycle into the shift register 25 is the same as the processing cycle of data in each channel of the channel-to-channel skew compensation apparatus. Therefore, each time an error signal is generated, information on the error is successively held in the bits in the respective shift registers 25.

Adder circuit 26 in the frame loss detection circuit 23 receives the data held in bits 1, 2, 3, . . . , J in the shift register 25, and outputs a value of their sum. For example, if there are three bits to indicate that errors are present in the error signals held in the range of bits 1~J, then the adder circuit 26 outputs a value 3.

In effect, the value output by the adder circuit 26 varies in accordance with the frequency of errors generated in each channel that is detected in the error correction circuit 21. The value output by the adder circuit 26 is compared with a pre-determined threshold value A in the comparison circuit 27. When the value output by the adder circuit 26 is less than the threshold value A, a frame loss signal output by the comparison circuit 27 is at a 0-level (non-active level), and when the output value from the adder circuit 26 exceeds the threshold value A, a frame loss signal output by the comparison circuit 27 becomes a 1-level (active: frame loss state).

Similarly, the adder circuit 28 in the frame synchronization circuit 24 accepts the data held in bits 1, 2, 3, . . . , J, . . . , K of the shift register 25, and outputs a value of their sum. For example, when an error signal held in the range of bits 1~K contains five bits to show that there are errors, the adder circuit 28 output a value 5.

In effect, the value output by the adder circuit 28 varies in accordance with the frequency of errors generated in each channel that have been detected in the error correction circuit 21. The value output by the adder circuit 28 is compared with a pre-determined threshold value B in the comparison circuit 29. When the value output by the adder circuit 26 is less than the threshold value B, a frame sync signal output by the comparison circuit 29 is at a 0-level (non-active level), and when the output value from the adder circuit 28 exceeds the threshold value B, a frame sync signal output by the comparison circuit 27 becomes a 1-level (active: frame sync state).

It should be noted that, in FIG. 13, the number of data bits (K) in the shift register 25 assigned to the frame sync circuit 24 is larger than the number of error bits (J) in the shift register 25 assigned to the frame loss detection circuit 23, but this capacity relation can be interchanged, and the number of bits received in the frame detection circuit 23 and frame sync circuit 24 can be altered also.

N-channel parallel data input into the channel-to-channel skew compensation apparatus are obtained by encoding N'-channel parallel data according to the following procedure. First, N'-channel parallel data are error correction encoded in the parallel direction to convert to N-channel parallel data. Error correction encoded data in each channel are then frame encoded so that the frame length is the same in all the channels.

N-channel parallel data input into the present channel-to-channel skew compensation apparatus first enter the channel-to-channel skew compensation circuit 20, which synchronizes the frames in the frame sync circuit 22 in each channel, and aligns the leading bits of each frame, thereby outputting skew-compensated data.

Data compensated for skewing in the channel-to-channel skew compensation circuit 20 are decoded in the error correction circuit 21 to decode the error correction signals. In this example, because error correction encoding is performed in the parallel direction of the data, if there are k error correction codes (k are a natural number), for example, even if there is an error in the data in the maximum-k channel, all the channels having the error can be specified. Therefore, even if synchronization is lost in the maximum-k channel, error-free N'-channel data can be produced.

When error correction encoding is performed using 1-error-correction code, Humming code, for example, may be used. When using 2-error-correction code, BCH code, for example, may be used.

When skewing amount fluctuates, frame synchronization loss occurs in some channels in the frame sync circuit 22. In such a case, error correction circuit 21 outputs an error signal to indicate "error present" at frequent intervals, and the frame loss signal output by the frame loss detection circuit 23 becomes active, and frame sync circuit 22 executes synchronization adjustments.

Also, by the action of synchronization adjustments, when the frame sync circuit 22 operates in synchronization with the input data, the frequency of output of "no error" signal output by the error correction circuit 21 increases, frame sync signal output from the frame synchronization detection circuit 24 becomes active. From the active frame sync signal, frame sync circuit 22 can recognize that synchronization has been achieved successfully.

Accordingly, frame synchronization or loss of synchronization can be detected by checking if there are errors in the transmitted data. Therefore, there is no need to monitor a plurality of frames to check whether synchronization is being maintained. When skewing amount fluctuates, loss of frame synchronization can be detected rapidly, and steps to restore frame synchronization can be completed in short time. Therefore, errors generated by fluctuation in skewing amount are output over a shorter period of time, thereby lessening the possibility of generating errors in more channels than can be corrected by the error correction circuit 21 and increasing the reliability of the channel-to-channel skew compensation apparatus.

A plurality of error correction circuits may be arranged in parallel to construct one error correction circuit 21. For example, two BCH decoding circuits using 2-error code (15, 7) may be combined in parallel to enable error correction for a maximum of four channels in 30-channel parallel input data, thus providing an error correction circuit 21 to output 14-channel parallel data.

2-5. Embodiment 5

The structure and operation of the channel-to-channel skew compensation apparatus in Embodiment 5 are shown in FIGS. 14~17 and FIG. 19. The components which are the same as those in Embodiment 4 are referred to by the same reference numerals.

Figure 14:
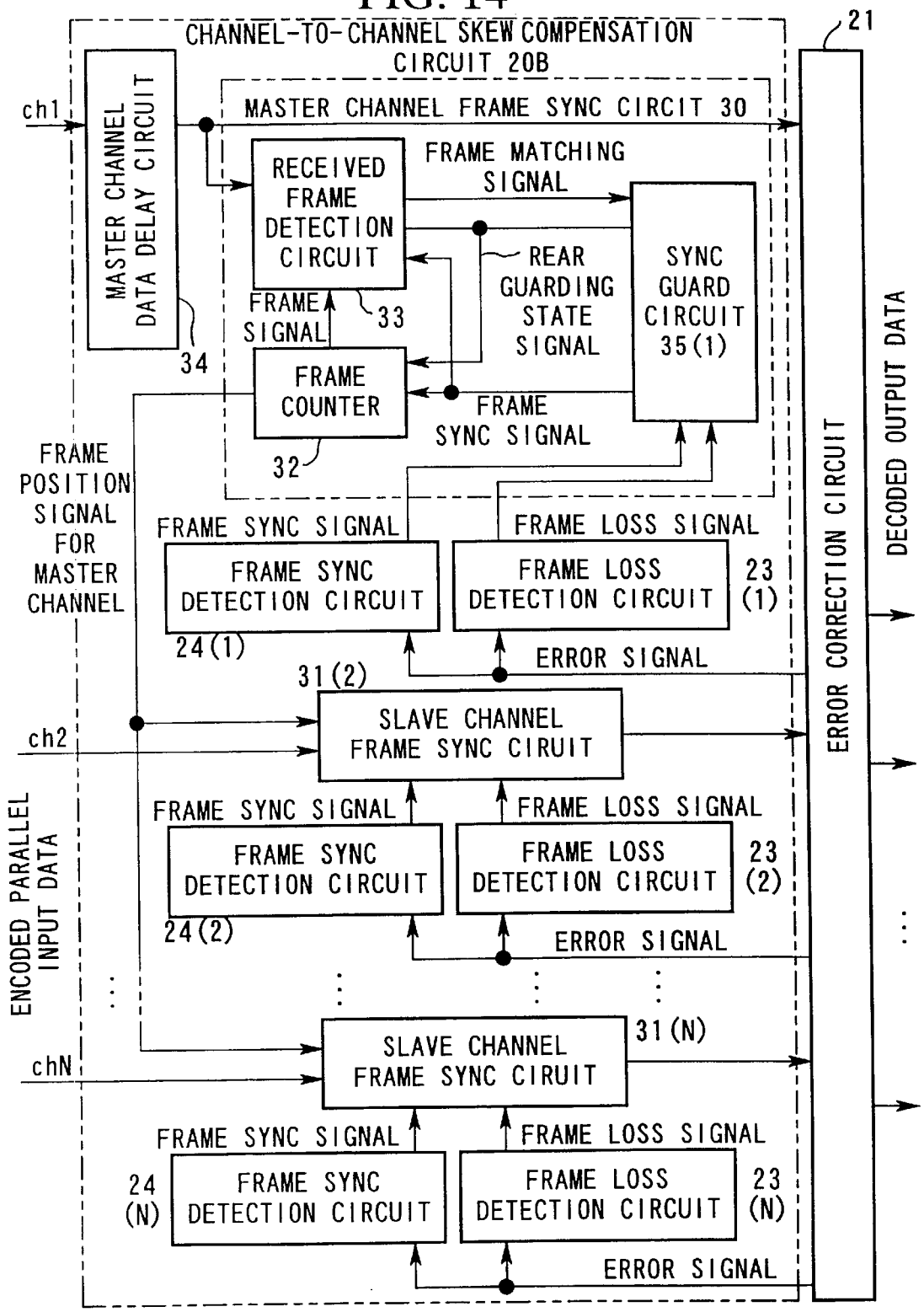
FIG. 14 is a block diagram of the channel-to-channel compensation apparatus in a fifth embodiment.
Figure 15:
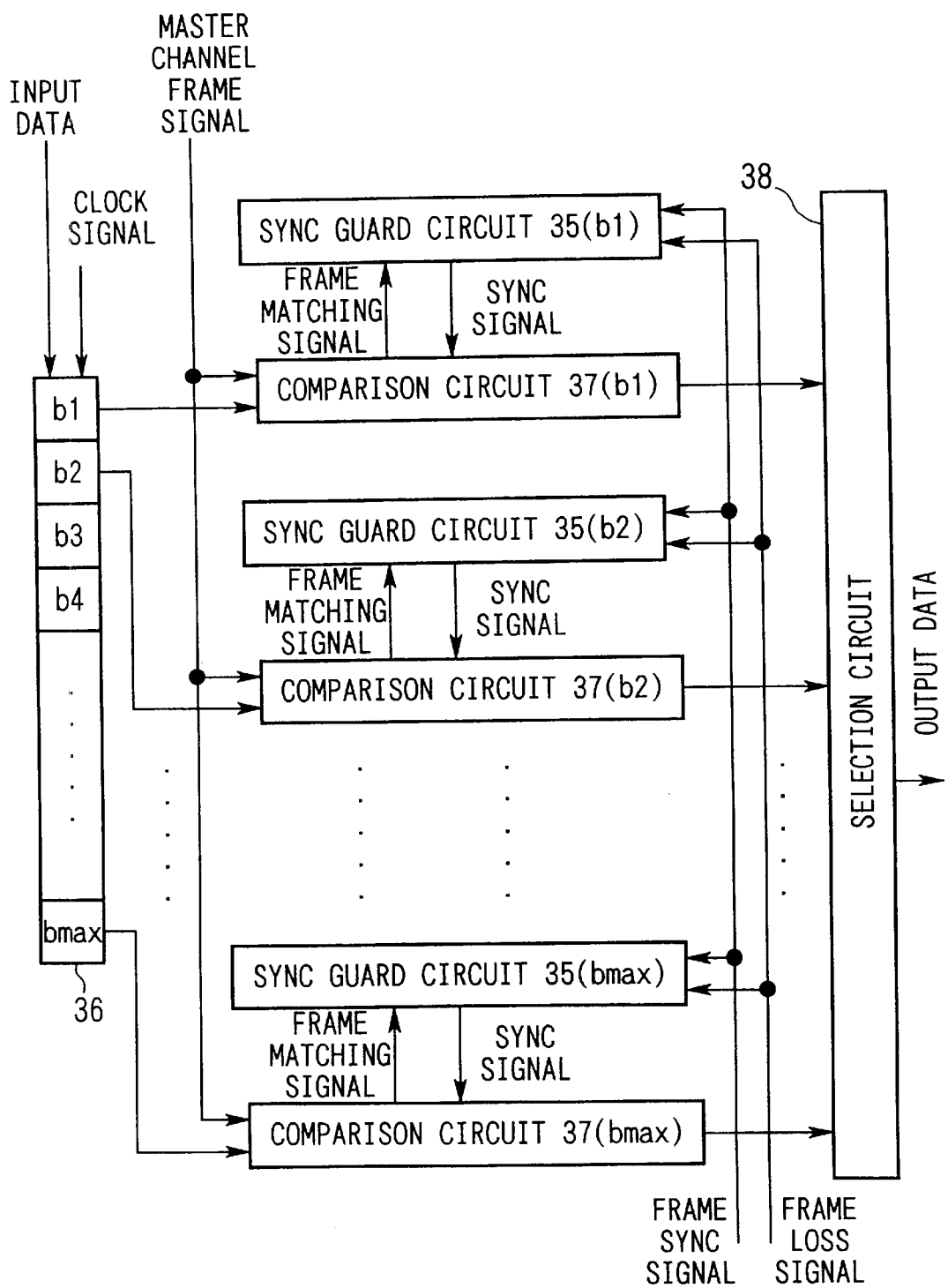
FIG. 15 is a block diagram of the slave channel frame sync circuit 31 shown in FIG. 13.
Figure 16:
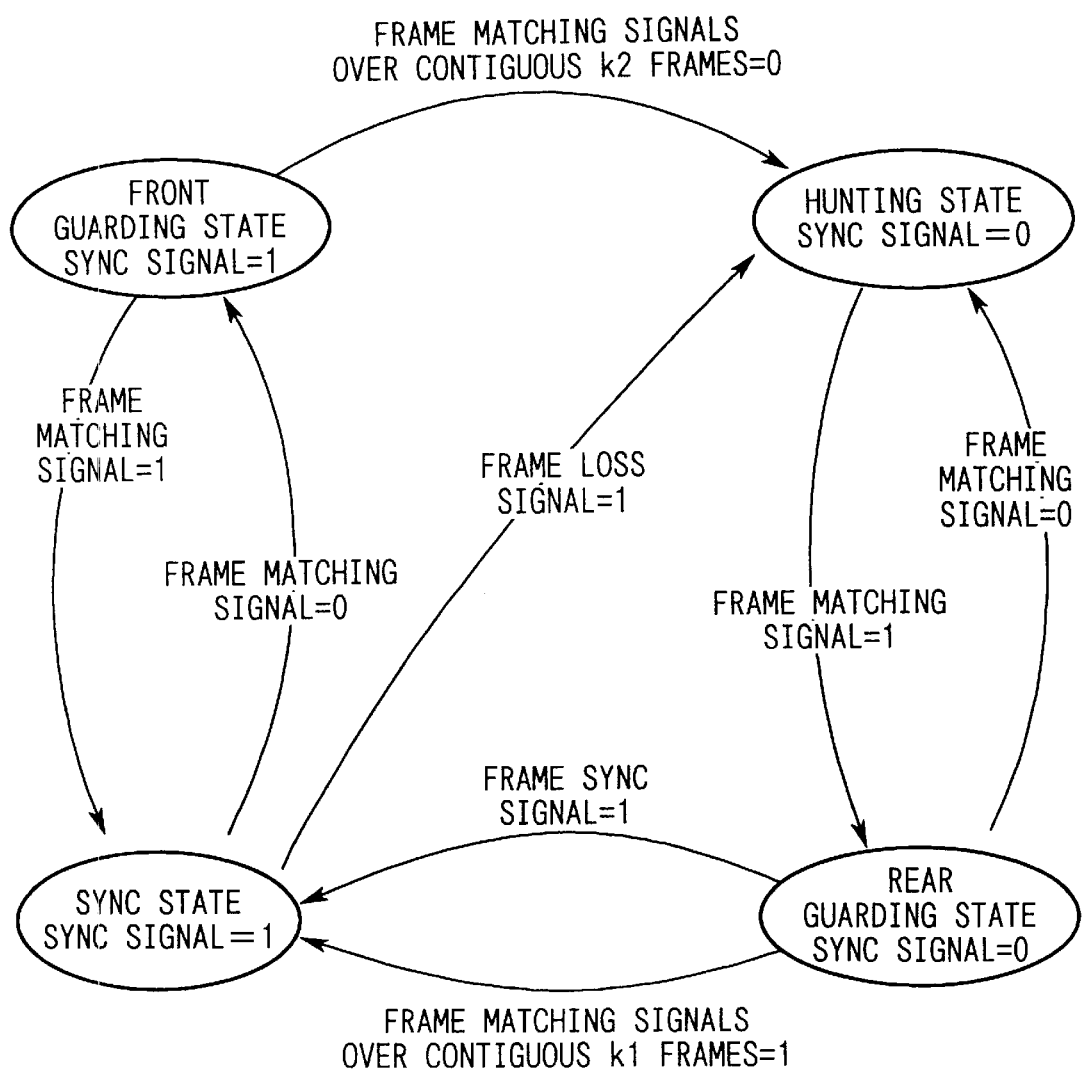
FIG. 16 is a diagram showing the transition of states in the synchronization guard circuit 32.
Figure 17:
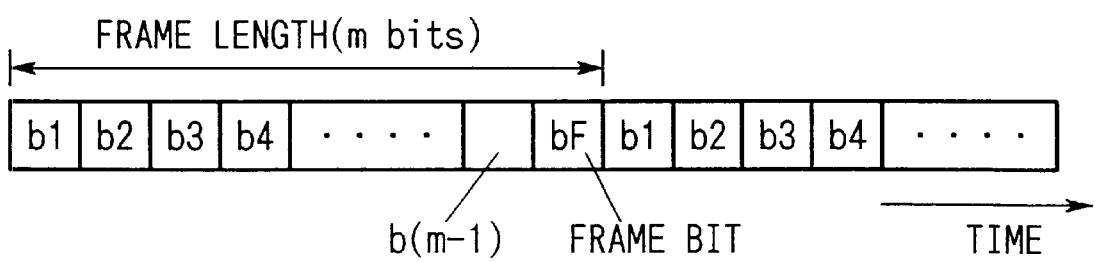
FIG. 17 is a schemtic diagram of an example of frame configuration of input data.
Figure 20:
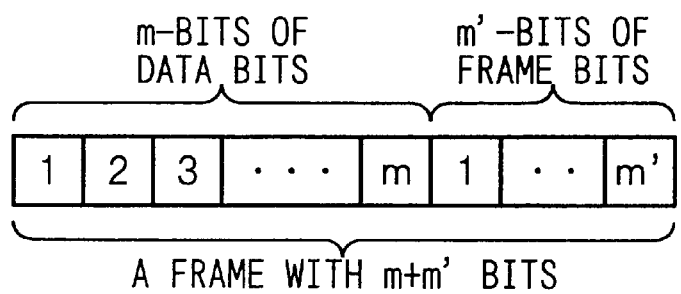
FIG. 20 is a diagram of an example of frame configuration for m+m' bits.

FIG. 14 is a block diagram of the channel-to-channel skew compensation apparatus. FIG. 15 is a block diagram showing the structure of a slave channel frame sync circuit 31. FIG. 16 is a state transition diagram of the sync guard circuit 35. FIG. 17 is a schematic diagram showing an example of the configuration of the input data frame. FIG. 19 is a time chart showing the operation of the master channel frame sync circuit 30.

In this embodiment, channel 1 of the N channels ch1, ch2, . . . , chN of the channel-to-channel skew compensation apparatus is pre-assigned to the master channel and the remaining channels are assigned to slave channels. Data input into the master channel ch1 are delayed by a given amount of time delay in the master channel data delay circuit 34. Time delay produced by the master channel data delay circuit 34 is represented by the numbers of pulses from a clock (not shown) impressed on the master channel data delay circuit 34, i.e., (m+1) along the time axis when converted into the number of data bits.

Data input into the individual slave channels ch2~chN are given time delay needed to compensate for channel-to-channel skewing in the slave channel frame sync circuit 31. The amount of time delay given in the slave channel frame sync circuit 31 varies according to channel-to-channel skewing amounts, and is determined by the frame positions (timing) of the data in the master channel and the frame positions of the data input into individual slave channels.

Data given a delay in the master channel data delay circuit 34 are input into the master channel frame sync circuit 30, which is provided with a frame counter 32, a received frame detection circuit 33 and a sync guard circuit 35.

Operation of the master channel frame sync circuit 30 will be explained with reference to FIGS. 14 and 19. Data input into master channel frame sync circuit 30 are input into the received frame detection circuit 33, which checks for frame bit bF (refer to FIG. 17) included in each frame of input data. In addition to the data output by the master channel frame sync circuit 30, the received frame detection circuit 33 also receives rear guarding state signal output from the sync guard circuit 35 and frame signals output from the frame counter 32.

Received frame detection circuit 33 detects frame bits bF contained in the input data. When the sync guard circuit 35 is in a hunting state (will be explained later), indicating that neither frame sync signal nor rear guarding state signal is input into the received frame detection circuit 33, the frame counter 32 outputs frame matching signals at a timing to synchronize with the frame bits bF.

When the sync guard circuit 35 is not in the hunting state, in other words, the received frame detection circuit 35 has an input of either a rear guarding state signal or a frame sync signal, the received frame detection circuit 33 outputs a frame matching signal when the timing of active frame signals matches the timing of receiving of frame bits. In addition to the frame matching signal output by the received frame detection circuit 33, the sync protection circuit 35 receives frame sync signals output by the frame sync detection circuit 24 and frame loss signals output by the frame loss detection circuit 23.

Operating state of the sync guard circuit 35, in providing synchronization guarding operation, changes as shown in the state transition diagram shown in FIG. 16. Referring to the state transition diagram, special features are found in the manner of transition response to input of frame loss signals and frame sync signals. If a frame loss signal is input by the frame loss detection circuit 24 when the sync guard circuit 35 is in sync guarding state, it immediately changes to the hunting state (non-sync state). And, if a frame sync signal is input by the frame sync detection circuit 25 when the sync guard circuit 35 is in the rear guarding state, it immediately changes to the synchronization state.

Sync guard circuit 35 outputs rear guarding state signals when its internal state is in the rear guarding state shown in FIG. 16, and outputs sync signals when the internal state is in the sync state or front guarding state. Frame counter 32 connected to the sync guard circuit 35 begins counting the clock (not shown) at in synchronization with the rear guarding state signal becoming active, and outputs a frame signal for every count of clock pulses equal to the frame length m.

When the sync signal becomes active, frame counter 32 outputs frame position signals at the same timing as the master channel frame signals. When the frame matching signal becomes [0] over contiguous k2-frames or when the frame loss signal becomes [1], sync guard circuit 35 goes to the hunting state, and the sync signal becomes non-active, the frame counter 32 is reset and counting is stopped. By following these steps, the master channel frame sync circuit 30 outputs frame signals for the master channel. Frame position signals for the master channel are impressed on each salve frame sync circuit 31.

The structure of the slave channel frame sync circuit 31 is shown in FIG. 15. As shown in this drawing, this slave channel frame sync circuit 31 is provided with a shift register 36 capable of holding data of [bmax] number of bits. The number of bits [bmax] held in the shift register 36 is determined by the delay amount (number of bits), and is equal to $(2 \cdot m+1)$ when the delay amount is $(m+1)$.

Shift register 36 holds data in synchronization with the clock signals operating at the same timing as the bit rate of input data, and shifts data position one bit at a time for each clock pulse. That is, input data is first held in bit position b1, and the position holding this bit is shifted to bit positions b2, b3, b4 ... for each pulse of a clock signal. Output data from the shift register 36 can be delayed by a maximum of about twice the delay amount that can be provided by the master channel data delay circuit 34.

As shown in FIG. 15, corresponding to each bit b1, b2, b3, ..., bmax in the shift register 36, comparison circuits 37(b1~bmax) and sync guard circuits 35(b1~bmax) are provided. Data output from each bit in the shift register 36 are input into respective comparison circuit 37(b1~bmax). Each of these comparison circuits 37(b1~bmax) receives output data from each bit in the shift register 36 and frame position signals from the master channel.

When frame position signal of the master channel is active, each comparison circuit 37(b1~bmax) outputs a frame matching signal upon receiving a frame bit from the shift register 36 to the respective sync guard circuit 35(b1~bmax). Sync guard circuit 32(b1~bmax) included in the slave channel frame sync circuit 31 follows the state transition shown in FIG. 16, as in the case of the sync guard circuit 35.

Sync guard circuit 35(b1~bmax) outputs a sync signal when synchronized to respective comparison circuits 37(b1~bmax). Comparison circuit 37(b1~bmax), upon receiving respective sync signal, outputs data input from the shift register 36. Selection circuit 38 outputs data from a particular comparison circuit 37(b1~bmax) that received sync signals.

Error correction circuit 21 shown in FIG. 14 performs error correction in the N-channel parallel data output from the channel-to-channel skew compensation circuit 20 and outputs error corrected data as output data. If there is an error, it further outputs an error signal to the error signal line of the channel having the error. Error signal is input into frame loss detection circuit 23 and frame sync detection circuit 24 provided in each channel. This construction is the same as that used in Embodiment 1.

The example of the frame loss detection circuit 23 and frame sync detection circuit 24, shown in FIG. 13, share the same error counting shift register 25. Therefore, a compact circuit construction is obtained. It is also permissible to provide an independent shift register in each frame loss detection circuit 23 and frame sync detection circuit 24.

Accordingly, even if the slave channel frame sync circuit 31 outputs erroneous data due to non-synchronization caused by skewing fluctuation, error-free data can be output because of the action of the error correction circuit 21. If frame loss should occur in the master frame sync circuit 30 due to skewing amount fluctuation, it is not possible to send correct frame positions to the slave channel sync circuits 31(1~N), and erroneous data are output from all the output channels of the channel-to-channel skew compensation circuit 20.

Even in such a case, the present channel-to-channel skew compensation apparatus shown in FIG. 14 can judge frame loss or frame sync from the frequency of error generation; therefore, frame loss can be detected quickly relative to the approach of observing a plurality of frames, and sync recovery can also be determined quickly, thereby shortening the duration of outputting erroneous data.

2-6. Embodiment 6

Figure 18:
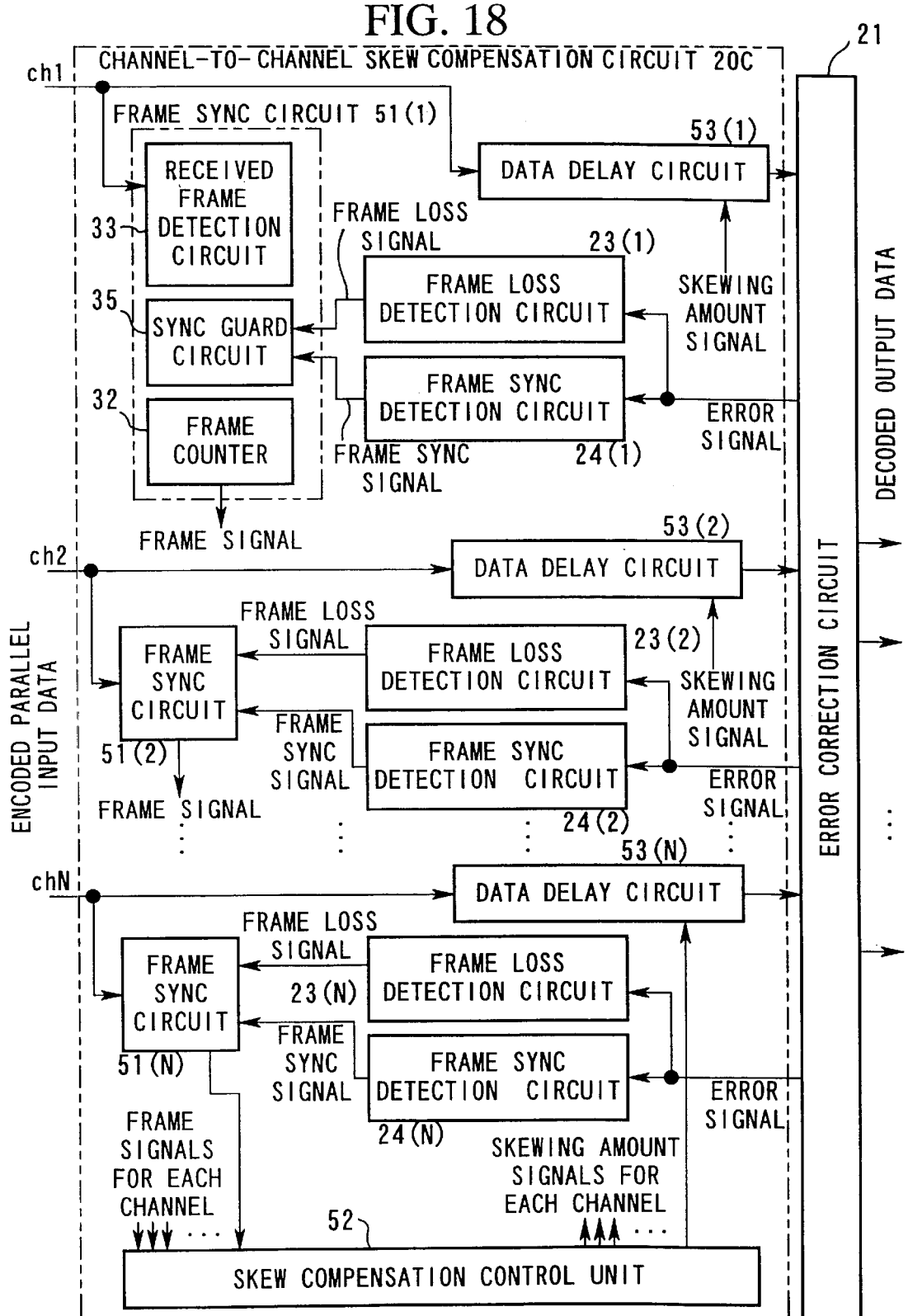
FIG. 18 is a block diagram of the channel-to-channel compensation apparatus in a sixth embodiment.
Figure 21:
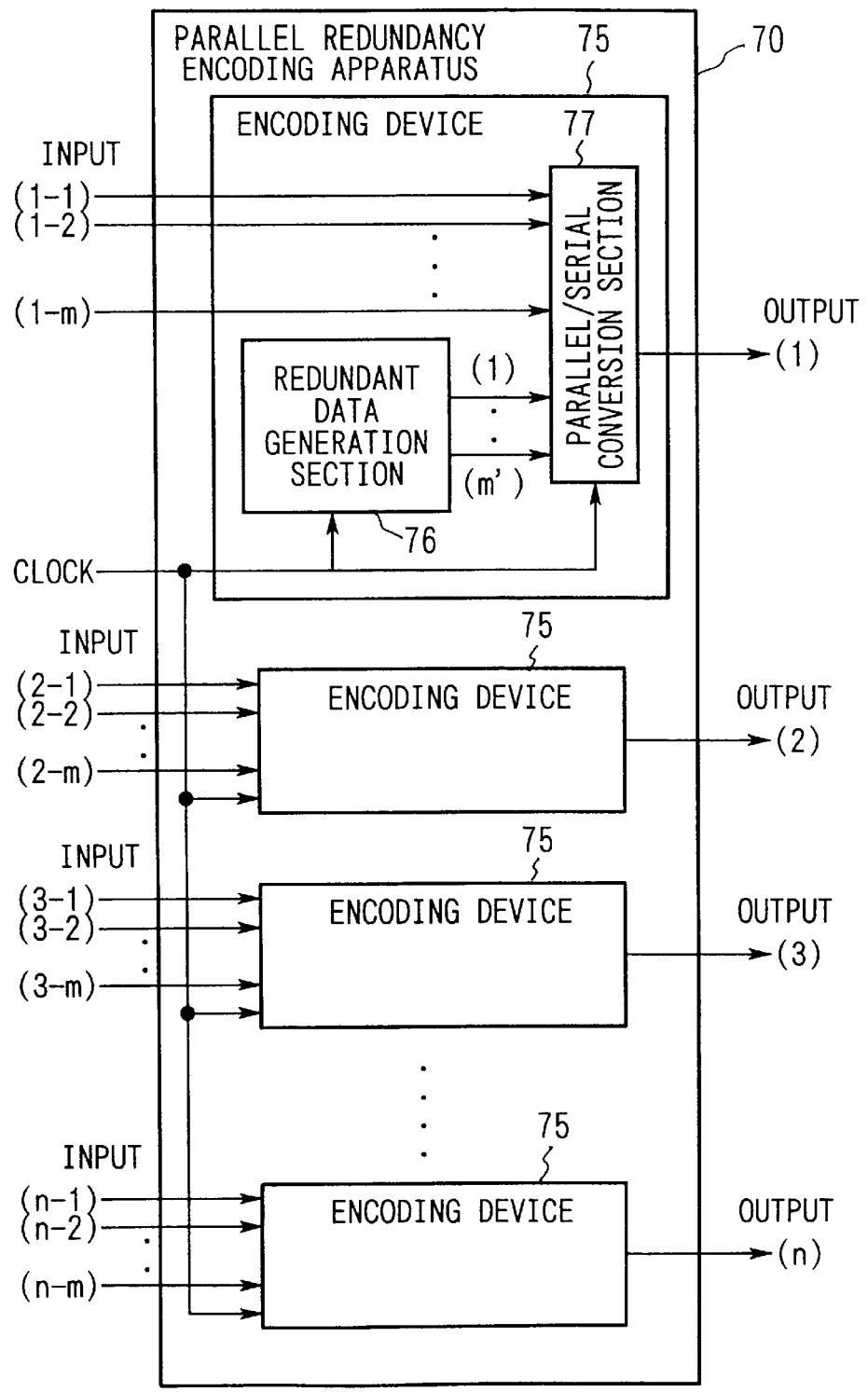
FIG. 21 is a diagram of a conventional parallel redundancy generator.
Figure 22:
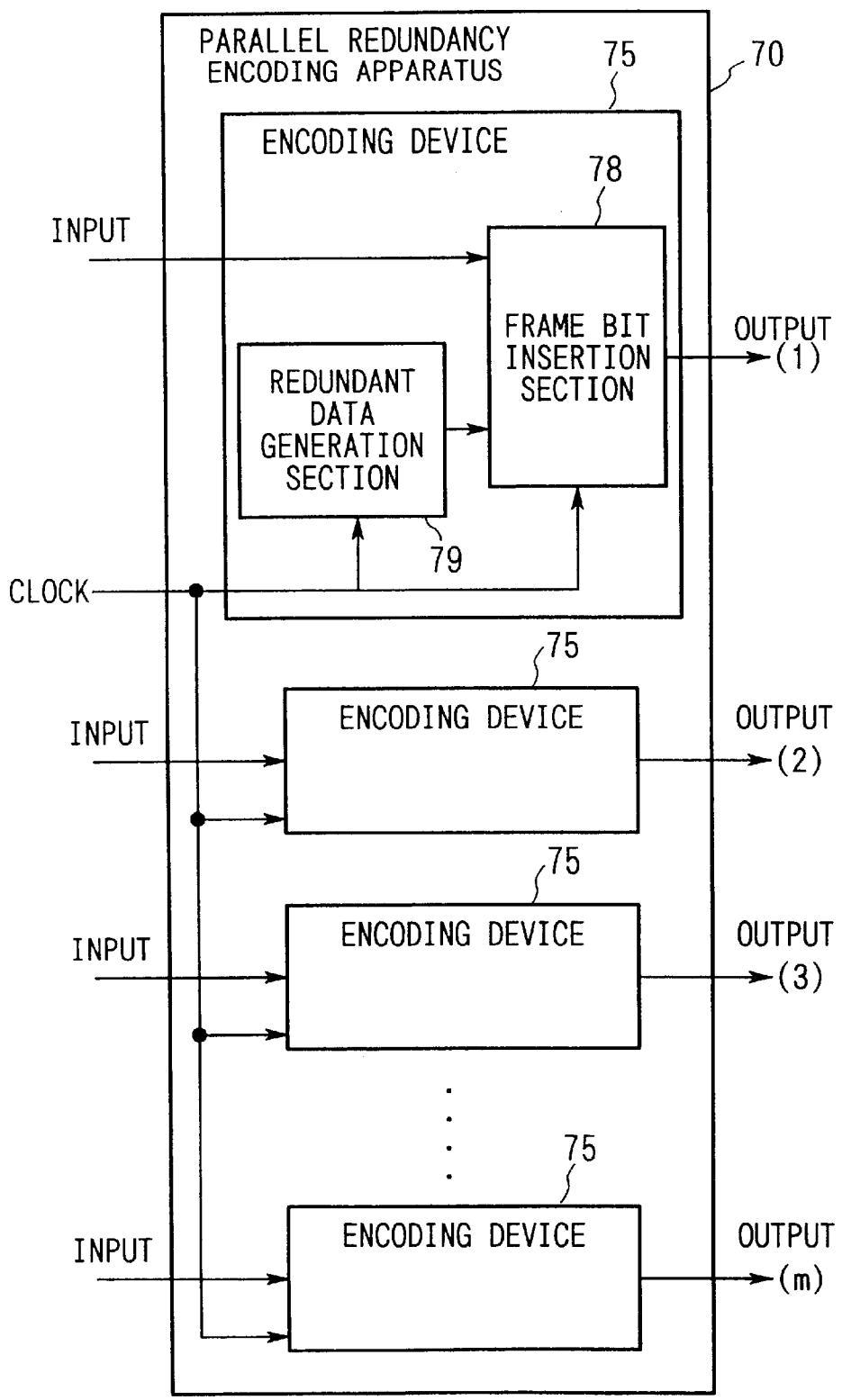
FIG. 22 is a diagram of another conventional parallel redundancy generator.
Figure 23:
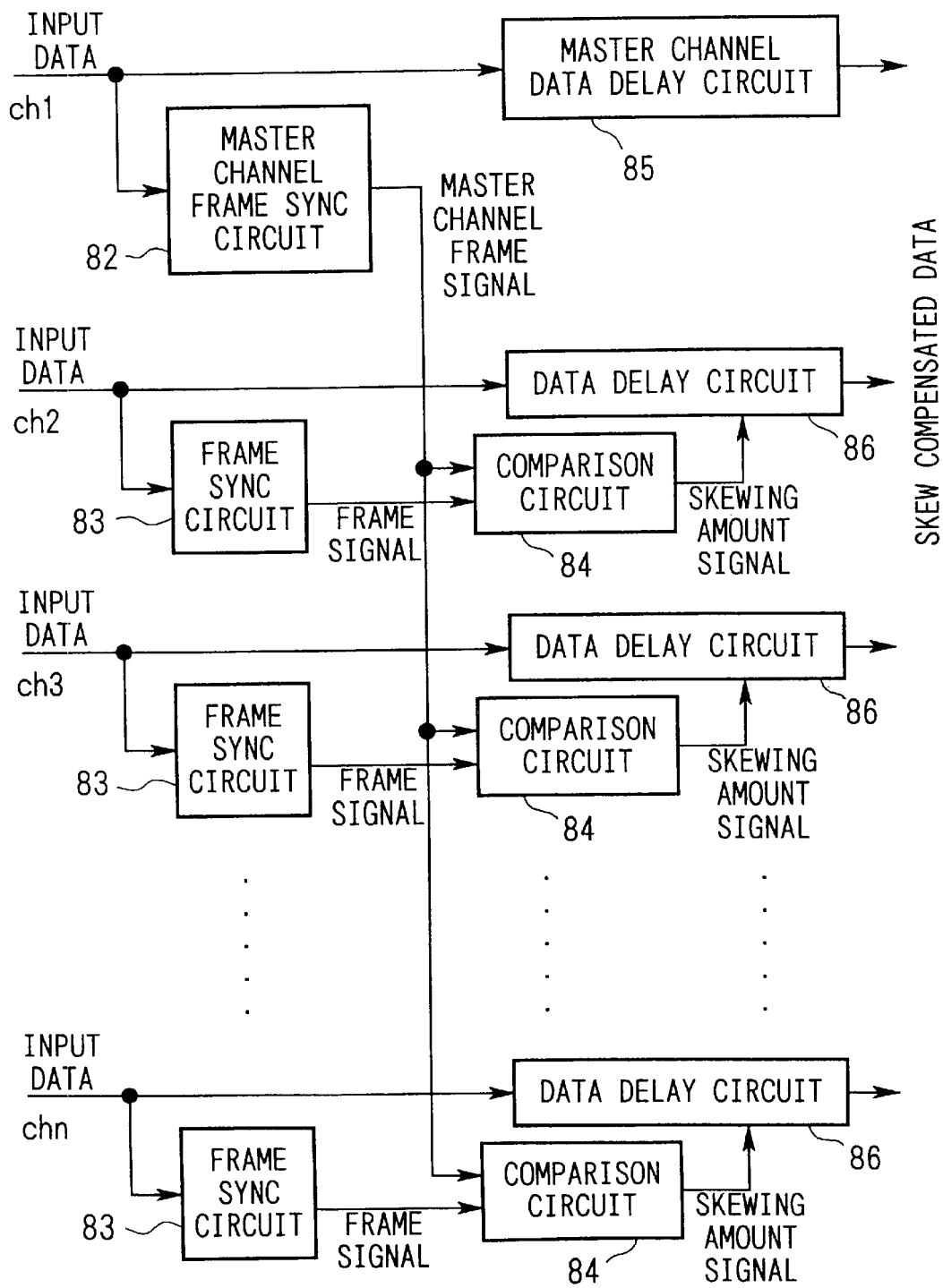
FIG. 23 is a block diagram of a conventional channel-to-channel skew compensation apparatus.

The structure of the channel-to-channel skew compensation apparatus in Embodiments 6 is shown in FIG. 18. In this drawing, the components which are the same as those in Embodiments 4 and 5 are referred to by the same reference numerals. In FIG. 18, the frame sync circuit 51, which is provided in each channel, has the same construction as the master channel frame sync circuit 30 shown in FIG. 14. Frame sync circuit 51 outputs frame signals by following the same actions as the master channel frame sync circuit 30.

Skew compensation control uniut 52 receives frame signals output from each channel in the frame sync circuit 51, and judges a skewing amount in various channels by relative comparison of the frame signals received from all the channels, and outputs a skew signal for a particular channel. The data delay circuit 53 in each channel provides a delay amount to the data passing through the channel, according to the skew signal output from the skew compensation control uniut 52.

The result is that data having the frame position adjusted according to timing to align with other frame positions in all the channels are output from the data delay circuit 53 in each channel. Accordingly, channel-to-channel skew compensation circuit 20C outputs skew-compensated parallel data from N-channels.

Error correction circuit 21 connected to the channel-to-channel skew compensation circuit 20C performs in the same manner as in Embodiments 4 and 5. That is, error correction codes are decoded for the N-channel parallel data output from the channel-to-channel skew compensation circuit 20C, which outputs error corrected data as output data. Error signals are sent to the channels which produced respective errors.

Error signal is input into the frame loss detection circuit 23 and frame sync detection circuit 24 in each channel, which are constructed in the same way as those in Embodiment 4. Frame loss signal output by the frame loss detection circuit 23 and frame sync signal output by the frame sync detection circuit 24 are input into the sync guard circuit 35 included in the frame sync circuit 51. Sync guard circuit 35 performs sync guarding action according to the transition diagram shown in FIG. 16.

Accordingly, even when erroneous data are output by the frame sync circuit 51 due to skewing amount fluctuation, error correction circuit 21 assures error-free output data.

What is claimed is:

1. A channel-to-channel skew compensation apparatus comprising:
   an N number of frame synchronization circuits, provided for each transmission channel used, receiving parallel input data comprised by N parallel bits of not less than two bits located at identical bit-positions arranged on a common time axis, transmitted in parallel over N transmission channels, and generating frame signals to indicate positions of said parallel data on said common time axis for each operative transmission channel;
   a reference timing determination circuit for deciding a reference timing according to N pieces of frame signals output from said frame synchronization circuits;
   a skewing amount detection section for generating N pieces of skewing amount signals according to said reference timing determined by said reference timing determination circuit; and
   a timing compensation circuit provided in each transmission channel for adjusting output timing of said parallel data for individual transmission channels according to skewing amount signals generated by said skewing amount detection section.

2. A channel-to-channel skew compensation apparatus according to claim 1, wherein said reference timing determination circuit includes an N number of shift registers to store an each of N frame signals over a plurality of clock cycles, and a logic computation section to determine reference timing based on output signals from said shift registers.

3. A channel-to-channel skew compensation apparatus according to claim 2, wherein said skewing amount detection section includes a data holding section in each channel for holding signals output from said shift registers at a reference timing determined by said reference timing determination circuit.

4. A channel-to-channel skew compensation apparatus according to claim 3, wherein said logic computation section includes a start signal generation section for generating a start signal upon detecting that a frame signal is held in all N number of said shift registers in said reference timing determination circuit; and a counter section for counting a given count of clock signals according to said start signal and repeatedly output said reference timing signals at a period identical to a frame period of said parallel data.

5. A channel-to-channel skew compensation apparatus according to claim 4, wherein said logic computation section includes a reset signal generation section for stopping operation of said counter section, when said counter section is outputting said reference signal, upon detecting that a frame signal is not held in any one of N shift registers in said reference timing determination circuit.

6. A channel-to-channel skew compensation apparatus according to claim 4, wherein said start signal generation section includes a mid-position identify section for generating a start signal upon detecting that a frame signal is held in all said N shift registers in said reference timing determination circuit, by identifying a bit-position which appears first on said common time axis as a leading position of said N number of frame signals, and identifying another bit-position which appears last on said common time axis as a trailing position, so as to output a start signal when a mid-position frame signal between said leading position and said trailing position approaches a middle-bit position of a shift register.

7. A channel-to-channel skew compensation apparatus according to claim 4, wherein said start signal generation section includes a multiple-position identify section for identifying a frame position on said common time axis that is shared by a maximum number of frame signals among N frame signals as a maximum position, so as to output said start signal when a frame signal on said maximum position approaches said middle-bit position of a shift register.

8. A channel-to-channel skew compensation apparatus receiving parallel input data that are pre-encoded for error correction, obtained by transmitting in parallel a plurality of bits, located at identical positions on a common time axis, over a plurality of transmission channels, and compensating channel-to-channel positional shifts in said parallel input data on said common time axis, comprising:
   an error correction section receiving parallel data which have been error correction encoded for channel-to-channel positional shifts on said common time axis and decoding error corrections of said parallel data, and generating an error signal to indicate that there is or there is no error in each transmission channel; and
   a channel-to-channel skew compensation section for adjusting channel-to-channel positional shifts on said common time axis in said parallel input data.

9. A channel-to-channel skew compensation apparatus receiving parallel input data that are pre-encoded for error correction, obtained by transmitting in parallel a plurality of bits, located at identical positions on a common time axis, over a plurality of transmission channels, and compensating channel-to-channel positional shifts in said parallel input data on said common time axis, comprising:

a frame position detection section in each transmission channel for detecting frame positions on a common time axis of said parallel input data;

a channel-to-channel skew compensation section for adjusting channel-to-channel positional shifts in said parallel data on said common time axis, based on frame positions in not less than two transmission channels on said common time axis detected by said frame position detection section;

an error correction section receiving parallel data that are error correction encoded for channel-to-channel positional shifts on said common time axis, and decoding error corrections provided for said parallel data, and generating an error signal to indicate that there is or there is no error in each transmission channel; and an error control section for controlling a detection state of said frame position detection section according to error signals output by said error correction section.

10. A channel-to-channel skew compensation apparatus according to claim 9, wherein a synchronization guard section is provided in each transmission channel for delaying an adjustment of a positional shift, detected by said frame position detection section, to be applied by said channel-to-channel skew compensation section until specific conditions are fulfilled.

11. A channel-to-channel skew compensation apparatus according to claim 10, wherein a frame loss detection section is provided in each transmission channel for detecting a frequency of errors generated in each transmission channel, based on error signals output from said error correction section, and outputting a frame loss signal to said synchronization guard section when said frequency of errors exceed a given value.

12. A channel-to-channel skew compensation apparatus according to claim 10, wherein a frame synchronization detection section is provided in each transmission channel for detecting a frequency of errors generated in each transmission channel, based on error signals output from said error correction section, and outputting a frame synchronization signal to said synchronization guard section when said frequency of errors are a given value or less.

* * * * *